United States Patent
Dahme et al.

(10) Patent No.: US 12,316,753 B1
(45) Date of Patent: May 27, 2025

(54) SECURE MULTI-AGENT SYSTEM FOR PRIVACY-PRESERVING DISTRIBUTED COMPUTATION

(71) Applicant: K2 Network Labs, Inc., Dover, DE (US)

(72) Inventors: Harrison Dahme, Stateline, NV (US); Nicholas Roberts-Huntley, New York, NY (US)

(73) Assignee: K2 Network Labs, Inc., Dover, DE (US)

( * ) Notice: Subject to any disclaimer, the term of this patent is extended or adjusted under 35 U.S.C. 154(b) by 0 days.

(21) Appl. No.: 19/044,591

(22) Filed: Feb. 3, 2025

(51) Int. Cl.
  *H04L 9/08* (2006.01)
  *H04L 9/00* (2022.01)
  *H04L 9/32* (2006.01)

(52) U.S. Cl.
  CPC ............ *H04L 9/085* (2013.01); *H04L 9/0869* (2013.01); *H04L 9/0891* (2013.01); *H04L 9/3236* (2013.01); *H04L 9/3255* (2013.01); *H04L 9/50* (2022.05)

(58) Field of Classification Search
  None
  See application file for complete search history.

(56) References Cited

U.S. PATENT DOCUMENTS

| | | | |
|---|---|---|---|
| 10,452,978 B2 | 10/2019 | Shazeer | |
| 10,740,433 B2 | 8/2020 | Dehghani | |
| 11,790,115 B1 * | 10/2023 | Townsend | G06F 21/6245 726/28 |
| 11,921,824 B1 | 3/2024 | Hester | |

(Continued)

FOREIGN PATENT DOCUMENTS

WO  WO-2024229857 A1 * 11/2024

OTHER PUBLICATIONS

A Differential Privacy Federated Learning Scheme with Improved Noise Perturbation; D.-S. Huang et al. (Eds.): ICIC 2024, LNCS 14870, pp. 61-71, 2024.

(Continued)

*Primary Examiner* — Taghi T Arani
*Assistant Examiner* — Joshua Raymond White
(74) *Attorney, Agent, or Firm* — CipherLaw

(57) ABSTRACT

The present disclosure provides a system for secure compute using artificial intelligence agents. The system includes a hardware execution environment with one or more computerized processors and electronic storage media. The processors are configured to establish a secure agent comprising a secure state management module, an encrypted state transition management module, a threshold cryptography implementation, and a digital signature verification module. The system also includes a plurality of atomic agents, each configured to perform a composite task and comprising a task-specific execution module, a state management interface, and a communication module. An orchestrator agent coordinates secure execution of the atomic agents and includes a task distribution module, a result aggregation module, a workflow management module, and a security policy enforcement module. The orchestrator agent integrates encrypted outputs from the atomic agents to perform composite tasks while maintaining data integrity and security through the secure state management module.

20 Claims, 13 Drawing Sheets

(56) References Cited

U.S. PATENT DOCUMENTS

| | | | |
|---|---|---|---|
| 12,205,575 B2 | 1/2025 | Beaufays | |
| 2020/0082226 A1 | 3/2020 | Shazeer et al. | |
| 2022/0094554 A1* | 3/2022 | Sekar | H04L 9/0861 |
| 2023/0281638 A1* | 9/2023 | Kaiser | G06Q 30/018 |
| 2024/0202225 A1* | 6/2024 | Siebel | G06F 16/338 |

OTHER PUBLICATIONS

Advanced Intelligent Computing Technology and Applications; 20th International Conference, ICIC 2024 Tianjin, China, Aug. 5-8, 2024 Proceedings, Part IX.
How to keep text private? A systematic review of deep learning methods for privacy-preserving natural language processing; Know-Center GmbH, Graz, Austria; Published online: May 21, 2022.
Zhang, Z.; Ma, X.; Ma, J. Local Differential Privacy Based Membership-Privacy-Preserving Federated Learning for Deep-Learning-Driven Remote Sensing. Remote Sens. 2023, 15, 5050. https://doi.org/10.3390/rs15205050.
Measuring and Controlling Split Layer Privacy Leakage Using Fisher Information; arXiv:2209. 10119v1 [cs. CR] Sep. 21, 2022.
Privacy-preserving Federated Learning and its application to natural language processing; Knowledge-Based Systems 268 (2023) 110475.
Privacy-Preserving Graph Embedding based on Local Differential Privacy; arXiv:2310.11060v2 [cs.CR] Aug. 4, 2024.
Triad of Split Learning: Privacy, Accuracy, and Performance; 2021 International Conference on Information and Communication Technology Convergence (ICTC).
U-shaped Vertical Split Learning with Local Differential Privacy for Privacy Preserving; D.-S. Huang et al. (Eds.): ICIC 2024, LNCS 14870, pp. 72-81, 2024.
Exploring Dimensionality Reduction Techniques in Multilingual Transformers; arXiv:2204.08415v1 [cs.CL] Apr. 18, 2022.
Rajput, A.R.; Li, Q.; Ahvanooey, M.T. A Blockchain-Based Secret-Data Sharing Framework for Personal Health Records in Emergency Condition. Healthcare 2021, 9, 206. https://doi.org/10.3390/healthcare9020206.
Training Text-to-Text Transformers with Privacy Guarantees; Findings of the Association for Computational Linguistics: ACL 2022, pp. 2182-2193 May 22-27, 2022.
How Does a Deep Learning Model Architecture Impact Its Privacy? A Comprehensive Study of Privacy Attacks on CNNs and Transformers; arXiv:2210.11049v3 [cs.CR] Feb. 2, 2024.
Kalian, A.D.; Benfenati, E.; Osborne, O.J.; Gott, D.; Potter, C.; Dorne, J.-L.C.M .; Guo, M.; Hogstrand, C. Exploring Dimensionality Reduction Techniques for Deep Learning Driven QSAR Models of Mutagenicity. Toxics 2023, 11, 572. https://doi.org/10.3390/toxics11070572.
DPFormer: Learning Differentially Private Transformer on Long-Tailed Data; arXiv:2305.17633v1 [cs.LG] May 28, 2023.
Differentially Private Decoding in Large Language Models; [Submitted on May 26, 2022 (v1), last revised Sep. 8, 2022 (this version, v2)].
Differentially Private Fine-tuning of Language Models; arXiv:2110.06500v2 [cs. LG] Jul. 14, 2022.
Deep learning approach based on dimensionality reduction for designing electromagnetic nanostructures; Published: Feb. 4, 2020.
Transformer-based dimensionality reduction; arXiv:2210.08288v1 [cs.CV] Oct. 15, 2022.
Yang, D.; Tsai, W.-T. An Optimized Encryption Storage Scheme for Blockchain Data Based on Cold and Hot Blocks and Threshold Secret Sharing. Entropy 2024, 26, 690. https://doi.org/10.3390/e26080690.
Privacy-Preserving Split Learning via Patch Shuffling over Transformers; 2022 IEEE International Conference on Data Mining (ICDM).
Kiya, H.; Nagamori, T.; Imaizumi, S.; Shiota, S. Privacy-Preserving Semantic Segmentation Using Vision Transformer. J. Imaging 2022, 8, 233. https://doi.org/10.3390/ jimaging8090233.
Bolt: Privacy-Preserving, Accurate and Efficient Inference for Transformers; 2023.

* cited by examiner

SECURE MULTI-AGENT SYSTEM FOR PRIVACY-PRESERVING DISTRIBUTED COMPUTATION

FIELD OF INVENTION

The present disclosure relates to secure distributed computing systems, and more particularly to a multi-agent system for privacy-preserving distributed computation using blockchain-based authentication and threshold cryptography.

BACKGROUND

Secure computation and agent-based systems have emerged as critical areas of research in the field of distributed computing and artificial intelligence. These technologies offer promising solutions for complex computational tasks that require collaboration between multiple entities while maintaining data privacy and security. However, the implementation of secure computation using agent-based systems presents numerous challenges that have yet to be fully addressed by existing approaches.

One of the primary limitations in current secure computation methods is the difficulty in balancing computational efficiency with robust security measures. Many existing systems rely on computationally intensive cryptographic protocols that introduce significant overhead, limiting their practical application in real-time scenarios. This trade-off between security and performance has hindered the widespread adoption of secure computation techniques in various domains, particularly those requiring rapid decision-making or processing of large datasets.

Another challenge in prior art secure computation methods is the lack of flexibility in handling diverse data types and computational tasks. Many existing solutions are tailored to specific use cases or data formats, making them unsuitable for general-purpose applications. This limitation restricts the applicability of secure computation across different industries and problem domains, where the nature of data and required computations can vary significantly.

Furthermore, current approaches often struggle with scalability issues when dealing with large-scale distributed systems. As the number of participating entities or the volume of data increases, many existing secure computation methods experience exponential growth in communication overhead and computational complexity. This scalability limitation poses a significant barrier to the deployment of secure computation techniques in scenarios involving numerous agents or massive datasets.

Agent-based approaches to secure computation have shown promise in addressing some of these challenges by leveraging the autonomy and distributed nature of intelligent agents. However, these approaches also face several limitations that hinder their effectiveness in real-world applications.

One notable limitation is the difficulty in coordinating and synchronizing multiple agents while maintaining the security and integrity of the overall system. Existing agent-based systems often lack robust mechanisms for ensuring consistent and secure state management across distributed agents, leading to potential vulnerabilities or inconsistencies in the computation process.

Additionally, many current agent-based approaches struggle with efficient task distribution and result aggregation in secure environments. The challenge lies in balancing the need for fine-grained control over agent activities with the requirement for data privacy and confidentiality. This often results in suboptimal resource utilization and increased latency in completing complex computational tasks.

Another significant issue in agent-based secure computation is the vulnerability to various forms of attacks, including collusion between malicious agents or external adversaries attempting to compromise the system. Existing solutions often lack comprehensive security measures to detect and mitigate such threats, potentially exposing sensitive data or corrupting the computation results.

The concept of sovereign data adds another layer of complexity to secure computation in agent-based systems. Sovereign data refers to information that is subject to the laws and regulations of a specific jurisdiction or entity, requiring strict control over its storage, processing, and transfer. In the context of secure computation, ensuring data sovereignty presents unique challenges that many existing systems fail to adequately address.

One of the primary challenges related to data sovereignty in multi-agent systems is the need to maintain compliance with diverse and often conflicting regulatory requirements across different jurisdictions. This becomes particularly complex in scenarios involving cross-border data transfers or distributed computation across multiple geographic regions.

Furthermore, existing secure computation methods often struggle to provide granular control over data access and processing in accordance with sovereignty requirements. Many systems lack the necessary mechanisms to enforce region-specific encryption schemes, access controls, or data localization policies, potentially leading to violations of data sovereignty regulations.

The importance of maintaining data sovereignty in secure computation scenarios cannot be overstated. As organizations increasingly operate in global environments and handle sensitive information from various sources, the ability to ensure compliance with data sovereignty requirements becomes crucial for legal and ethical reasons. Failure to address these concerns can result in severe legal consequences, reputational damage, and loss of trust from stakeholders.

While secure computation and agent-based systems offer significant potential for advancing distributed computing capabilities, numerous challenges and limitations persist in existing approaches. The difficulties in balancing security with performance, ensuring scalability, coordinating distributed agents, and addressing data sovereignty concerns highlight the need for innovative solutions in this field. As the demand for secure and privacy-preserving computation continues to grow across various industries, addressing these challenges becomes increasingly crucial. There is a clear necessity for a comprehensive approach that can overcome the limitations of prior art while providing a flexible, scalable, and secure framework for agent-based computation in sovereign data environments.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a system for secure compute using artificial intelligence agents is provided. The system includes a hardware execution environment comprising one or more computerized processors and electronic storage media, the one or more processors configured to establish a secure agent. The secure agent comprises a secure state management module configured to encrypt and decrypt states of one or more agents stored on the electronic storage media using a multisignature scheme, wherein the multisignature scheme requires a threshold number of signatures from authorized blockchain addresses to access the encrypted state. The secure agent also includes an encrypted state transition management module that interfaces with the secure state management module, the transition management module comprising encrypting the state of an agent before transmission to another agent using a symmetric encryption algorithm and decrypting the received encrypted state from another agent using the corresponding symmetric decryption algorithm and a shared key. Additionally, the secure agent comprises a threshold cryptography implementation for distributed key management, which interfaces with the secure state management module to split encryption keys into shares, and a digital signature verification module in communication with the threshold cryptography implementation to verify authenticity of signatures provided by blockchain addresses during the key reconstruction process.

The system further includes a plurality of atomic agents each configured to perform a composite task. Each atomic agent comprises a task-specific execution module configured to perform a designated computational task related to the composite task, a state management interface for securely interacting with the secure state management module using a multisignature scheme and threshold cryptography, and a communication module for exchanging encrypted messages with other agents using blockchain-based authentication and symmetric encryption.

The system also includes an orchestrator agent configured to coordinate secure execution of the atomic agents. The orchestrator agent comprises a task distribution module for assigning encrypted tasks to atomic agents using blockchain-based authentication, a result aggregation module for combining encrypted outputs from multiple atomic agents using threshold cryptography and storing the aggregated results on the electronic storage media, a workflow management module for defining and executing secure task sequences using encrypted state transition management, and a security policy enforcement module for ensuring compliance with system-wide security protocols, including digital signature verification using blockchain addresses. The orchestrator agent integrates encrypted outputs from the atomic agents to perform composite tasks while maintaining data integrity and security through the secure state management module.

According to other aspects of the present disclosure, the system may include one or more of the following features. The encrypted state transition management module may be configured to encrypt the state of an agent before transmission to another agent using a symmetric encryption algorithm, decrypt the received encrypted state from another agent using the corresponding symmetric decryption algorithm a shared key, verify the integrity of the decrypted state using a cryptographic hash function, compare the generated hash value with a previously stored hash value to detect modifications to the state during transmission, and initiate a secure key exchange protocol to establish a new shared symmetric key if the integrity verification fails or after a predetermined number of state transitions.

The secure communication protocol for inter-agent messaging may employ end-to-end encryption and further comprise a key exchange mechanism for establishing shared secret keys between agents, with support for region-specific encryption algorithms, a message authentication code, a nonce generated using a cryptographically secure random number generator or a millisecond-precision timestamp, data localization features configured to route messages through regional servers, implemented using a distributed hash table for peer discovery and a content-addressed networking protocol for message routing, and a fallback mechanism for secure local-only communication when cross-border data transfer is restricted, utilizing a local mesh network protocol.

The orchestrator agent may be configured to receive encrypted outputs from multiple atomic agents, wherein the encrypted outputs are transmitted using a secure communication protocol with end-to-end encryption, decrypt the outputs using the secure state management module, wherein the decryption process comprises verifying the integrity of the encrypted data and executing region-appropriate cryptographic algorithms, integrate the decrypted outputs to perform a composite task, wherein the integration process includes analyzing and combining data from multiple atomic agents, applying task-specific algorithms to process the combined data, resolving any conflicts or inconsistencies between outputs from different atomic agents, and encrypt the integrated result before transmission or storage.

The secure state management module may implement a key rotation protocol, comprising generating a new encryption key using a cryptographically secure random number generator and splitting it into shares using a threshold secret sharing scheme at predefined intervals, wherein the intervals are dynamically adjusted based on the collective state of the atomic agents, distributing the new shares to the blockchain addresses associated with the atomic agents, utilizing the secure communication protocol of the agent framework, establishing a transition period where both the old and new encryption keys are valid, re-encrypting the weights of the input privacy layer using the new encryption key, securely destroying the old encryption key and its shares after the transition period, coordinated by the orchestrator agent, and updating the agent state representations to reflect the new encryption key.

The secure state management module may include a privacy budget tracking component configured to monitor the cumulative privacy loss across multiple operations, adjust the noise addition in the input privacy layer based on the current privacy budget, and halt further operations when the privacy budget is exhausted to prevent excessive information leakage.

The atomic agents may include a data localization agent configured to identify data elements subject to sovereign data regulations, segregate the identified data elements into region-specific storage containers, apply region-specific encryption schemes to the segregated data, and manage access control policies to ensure data remains within authorized geographical boundaries during processing.

The orchestrator agent may implement a dynamic compliance module configured to maintain a repository of data sovereignty regulations for multiple jurisdictions, analyze input data and processing requirements against the regulatory repository, dynamically adjust the execution workflow to route data and computations through appropriate sovereign-compliant environments, generate audit logs of data flows and processing locations, and trigger alerts when potential compliance violations are detected.

The orchestrator agent may implement a dynamic compliance module configured to maintain a distributed knowledge base of data sovereignty regulations across the agent network, with specialized atomic agents responsible for updating and validating regulatory information for specific jurisdictions, analyze input data and processing requirements using a compliance analysis agent that interfaces with the regulatory knowledge base, dynamically reconfigure the execution workflow by instructing task distribution and routing agents to allocate computations and data flows through sovereign-compliant atomic agents and environments, coordinate with logging agents to generate audit trails of data movements and processing activities across the distributed agent ecosystem, and employ a network of monitoring agents that continuously assess compliance status, triggering alert protocols and initiating corrective actions through the orchestrator when potential violations are detected.

The orchestrator agent may integrate outputs from the atomic agents to perform composite tasks by receiving encrypted outputs from the atomic agents using asymmetric encryption, decrypting the outputs using the orchestrator's private key, verifying the authenticity of each output using digital signatures associated with the respective atomic agents, aggregating the decrypted and verified outputs, re-encrypting the composite result using a threshold encryption scheme, updating a global encrypted state in the secure state management module, and distributing encrypted task results to authorized agents using secure multiparty computation protocols.

According to another aspect of the present disclosure, a method for secure compute using artificial intelligence agents is provided. The method includes establishing a secure agent in a hardware execution environment, the secure agent comprising a secure state management module configured to encrypt and decrypt states of one or more agents stored on electronic storage media using a multisignature scheme, wherein the multisignature scheme requires a threshold number of signatures from authorized blockchain addresses to access the encrypted state, an encrypted state transition management module that interfaces with the secure state management module, the transition management module comprising encrypting the state of an agent before transmission to another agent using a symmetric encryption algorithm and decrypting the received encrypted state from another agent using the corresponding symmetric decryption algorithm and a shared key, a threshold cryptography implementation for distributed key management, which interfaces with the secure state management module to split encryption keys into shares, and a digital signature verification module in communication with the threshold cryptography implementation to verify authenticity of signatures provided by blockchain addresses during the key reconstruction process.

The method further includes configuring a plurality of atomic agents to perform a composite task, wherein each atomic agent comprises a task-specific execution module configured to perform a designated computational task related to the composite task, a state management interface for securely interacting with the secure state management module using a multisignature scheme and threshold cryptography, and a communication module for exchanging encrypted messages with other agents using blockchain-based authentication and symmetric encryption.

The method also includes establishing an orchestrator agent to coordinate secure execution of the atomic agents, wherein the orchestrator agent comprises a task distribution module for assigning encrypted tasks to atomic agents using blockchain-based authentication, a result aggregation module for combining encrypted outputs from multiple atomic agents using threshold cryptography and storing the aggregated results on the electronic storage media, a workflow management module for defining and executing secure task sequences using encrypted state transition management, and a security policy enforcement module for ensuring compliance with system-wide security protocols, including digital signature verification using blockchain addresses. The orchestrator agent integrates encrypted outputs from the atomic agents to perform composite tasks while maintaining data integrity and security through the secure state management module.

According to other aspects of the present disclosure, the method may include one or more of the following features. The encrypted state transition management module may be configured to encrypt the state of an agent before transmission to another agent using a symmetric encryption algorithm, decrypt the received encrypted state from another agent using the corresponding symmetric decryption algorithm a shared key, verify the integrity of the decrypted state using a cryptographic hash function, compare the generated hash value with a previously stored hash value to detect modifications to the state during transmission, and initiate a secure key exchange protocol to establish a new shared symmetric key if the integrity verification fails or after a predetermined number of state transitions.

The method may further include implementing a secure communication protocol for inter-agent messaging that employs end-to-end encryption and comprises a key exchange mechanism for establishing shared secret keys between agents, with support for region-specific encryption algorithms, a message authentication code, a nonce generated using a cryptographically secure random number generator or a millisecond-precision timestamp, data localization features configured to route messages through regional servers, implemented using a distributed hash table for peer discovery and a content-addressed networking protocol for message routing, and a fallback mechanism for secure local-only communication when cross-border data transfer is restricted, utilizing a local mesh network protocol.

The orchestrator agent may be configured to receive encrypted outputs from multiple atomic agents, wherein the encrypted outputs are transmitted using a secure communication protocol with end-to-end encryption, decrypt the outputs using the secure state management module, wherein the decryption process comprises verifying the integrity of the encrypted data and executing region-appropriate cryptographic algorithms, integrate the decrypted outputs to perform a composite task, wherein the integration process includes analyzing and combining data from multiple atomic agents, applying task-specific algorithms to process the combined data, resolving any conflicts or inconsistencies between outputs from different atomic agents, and encrypt the integrated result before transmission or storage.

The method may further include implementing a key rotation protocol in the secure state management module, comprising generating a new encryption key using a cryptographically secure random number generator and splitting it into shares using a threshold secret sharing scheme at predefined intervals, wherein the intervals are dynamically adjusted based on the collective state of the atomic agents, distributing the new shares to the blockchain addresses associated with the atomic agents, utilizing the secure communication protocol of the agent framework, establishing a transition period where both the old and new encryption keys are valid, re-encrypting the weights of the input privacy layer using the new encryption key, securely destroying the old encryption key and its shares after the transition period, coordinated by the orchestrator agent, and updating the agent state representations to reflect the new encryption key.

The method may further include implementing a privacy budget tracking component in the secure state management module configured to monitor the cumulative privacy loss across multiple operations, adjust the noise addition in the input privacy layer based on the current privacy budget, and halt further operations when the privacy budget is exhausted to prevent excessive information leakage.

The method may further include implementing a data localization agent configured to identify data elements subject to sovereign data regulations, segregate the identified data elements into region-specific storage containers, apply region-specific encryption schemes to the segregated data, and manage access control policies to ensure data remains within authorized geographical boundaries during processing.

The method may further include implementing a dynamic compliance module in the orchestrator agent configured to maintain a distributed knowledge base of data sovereignty regulations across the agent network, with specialized atomic agents responsible for updating and validating regulatory information for specific jurisdictions, analyze input data and processing requirements using a compliance analysis agent that interfaces with the regulatory knowledge base, dynamically reconfigure the execution workflow by instructing task distribution and routing agents to allocate computations and data flows through sovereign-compliant atomic agents and environments, coordinate with logging agents to generate audit trails of data movements and processing activities across the distributed agent ecosystem, and employ a network of monitoring agents that continuously assess compliance status, triggering alert protocols and initiating corrective actions through the orchestrator when potential violations are detected.

According to another aspect of the present disclosure, a non-transitory computer-readable medium storing instructions that, when executed by one or more processors, cause the one or more processors to perform operations is provided. The operations include establishing a secure agent in a hardware execution environment, the secure agent comprising a secure state management module configured to encrypt and decrypt states of one or more agents stored on electronic storage media using a multisignature scheme, wherein the multisignature scheme requires a threshold number of signatures from authorized blockchain addresses to access the encrypted state, an encrypted state transition management module that interfaces with the secure state management module, the transition management module comprising encrypting the state of an agent before transmission to another agent using a symmetric encryption algorithm and decrypting the received encrypted state from another agent using the corresponding symmetric decryption algorithm and a shared key, a threshold cryptography implementation for distributed key management, which interfaces with the secure state management module to split encryption keys into shares, and a digital signature verification module in communication with the threshold cryptography implementation to verify authenticity of signatures provided by blockchain addresses during the key reconstruction process.

The operations further include configuring a plurality of atomic agents to perform a composite task, wherein each atomic agent comprises a task-specific execution module configured to perform a designated computational task related to the composite task, a state management interface for securely interacting with the secure state management module using a multisignature scheme and threshold cryptography, and a communication module for exchanging encrypted messages with other agents using blockchain-based authentication and symmetric encryption.

The operations also include establishing an orchestrator agent to coordinate secure execution of the atomic agents, wherein the orchestrator agent comprises a task distribution module for assigning encrypted tasks to atomic agents using blockchain-based authentication, a result aggregation module for combining encrypted outputs from multiple atomic agents using threshold cryptography and storing the aggregated results on the electronic storage media, a workflow management module for defining and executing secure task sequences using encrypted state transition management, and a security policy enforcement module for ensuring compliance with system-wide security protocols, including digital signature verification using blockchain addresses. The orchestrator agent integrates encrypted outputs from the atomic agents to perform composite tasks while maintaining data integrity and security through the secure state management module.

According to other aspects of the present disclosure, the operations may further include implementing a secure communication protocol for inter-agent messaging that employs end-to-end encryption and comprises a key exchange mechanism for establishing shared secret keys between agents, with support for region-specific encryption algorithms, a message authentication code, a nonce generated using a cryptographically secure random number generator or a millisecond-precision timestamp, data localization features configured to route messages through regional servers, implemented using a distributed hash table for peer discovery and a content-addressed networking protocol for message routing, and a fallback mechanism for secure local-only communication when cross-border data transfer is restricted, utilizing a local mesh network protocol.

The operations may also include implementing a key rotation protocol in the secure state management module, comprising generating a new encryption key using a cryptographically secure random number generator and splitting it into shares using a threshold secret sharing scheme at predefined intervals, wherein the intervals are dynamically adjusted based on the collective state of the atomic agents, distributing the new shares to the blockchain addresses associated with the atomic agents, utilizing the secure communication protocol of the agent framework, establishing a transition period where both the old and new encryption keys are valid, re-encrypting the weights of the input privacy layer using the new encryption key, securely destroying the old encryption key and its shares after the transition period, coordinated by the orchestrator agent, and updating the agent state representations to reflect the new encryption key.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Overview of the Secure Multi-Agent System

Figure 1:
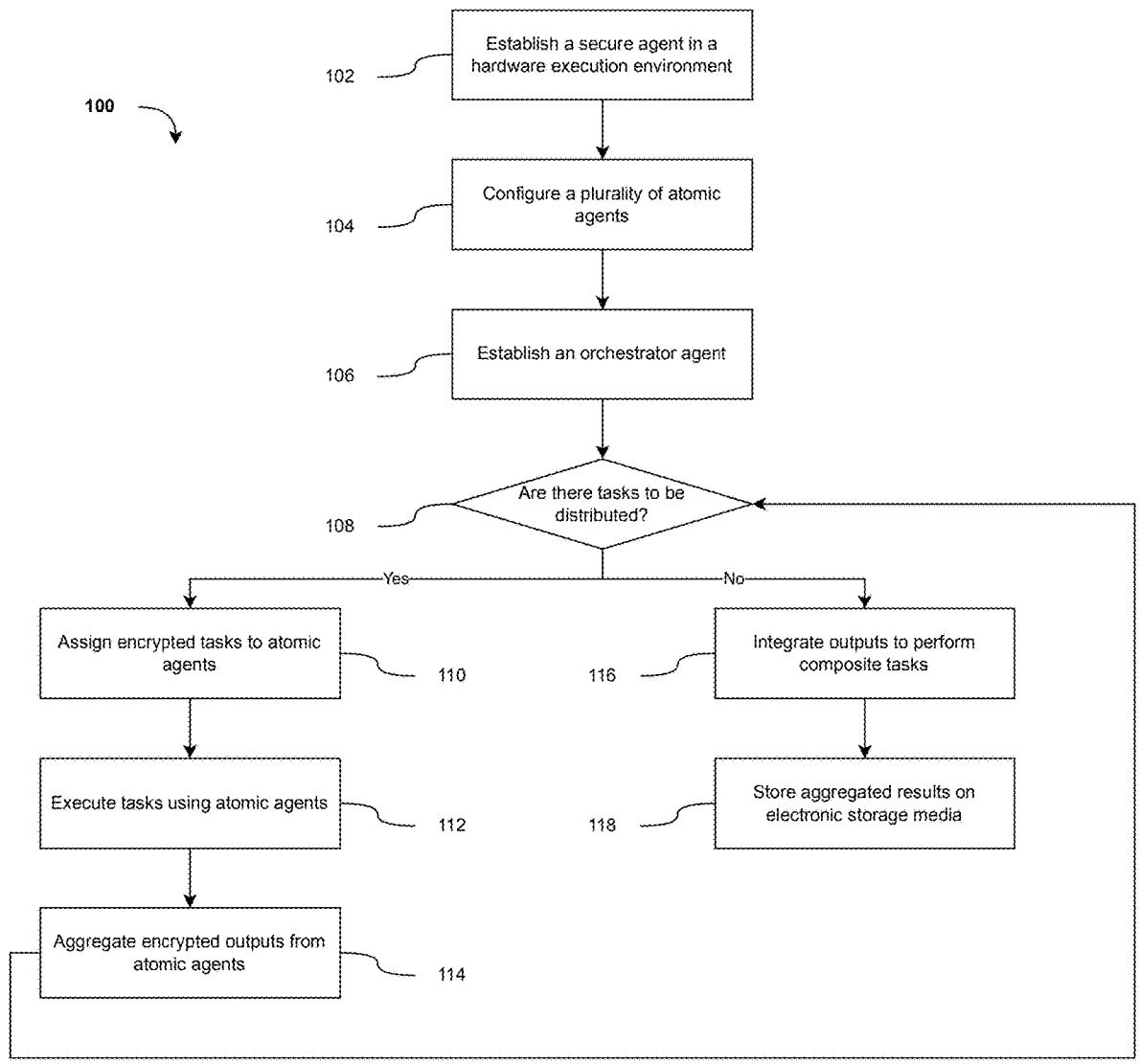
FIG. 1 illustrates a flowchart for a method of coordinating secure artificial intelligence agents, according to aspects of the present disclosure.

FIG. 1 illustrates a flowchart for a method 100 of coordinating secure artificial intelligence agents. The method 100 may provide an overview of a secure multi-agent system for privacy-preserving distributed computation.

The secure multi-agent system may include a plurality of atomic agents configured to perform a composite task. In some cases, the atomic agents may be specialized computational units designed to execute specific subtasks while maintaining data privacy and security.

The secure agent system may be implemented as instructions stored on a non-transitory computer-readable medium and executed by processors. This implementation may allow for flexible deployment across various hardware configurations while ensuring consistent security protocols.

A component of the system may be an orchestrator agent to coordinate secure execution of the atomic agents. The orchestrator agent may manage task distribution, result aggregation, and overall workflow of the composite task.

At the core of the system, a secure agent may be established, as shown in step 102 of method 100. The secure agent may comprise several modules:

1. A secure state management module may be responsible for encrypting and decrypting agent states, ensuring data privacy throughout the computation process.
2. An encrypted state transition management module may handle secure communication between agents, protecting data in transit.
3. A threshold cryptography implementation may provide distributed key management, enhancing system resilience against potential security breaches.
4. A digital signature verification module may authenticate blockchain addresses during key reconstruction, adding an additional layer of security.

The method 100 may proceed with step 104, where a plurality of atomic agents are configured. These atomic agents may be tailored to perform specific computational tasks related to the overall composite task.

In step 106, an orchestrator agent may be established to oversee the secure execution of atomic agents. The orchestrator agent may play a role in maintaining the integrity and security of the distributed computation process.

The method 100 may then reach decision step 108, which determines if there are tasks to be distributed. If tasks are available for distribution, the process may move to step 110, where encrypted tasks are assigned to atomic agents. This encryption may ensure that task details remain confidential even during distribution.

Step 112 may follow, executing tasks using atomic agents. Each atomic agent may perform its designated subtask while adhering to the system's security protocols.

In step 114, encrypted outputs from atomic agents may be aggregated. This aggregation process may combine results from multiple atomic agents while maintaining data confidentiality.

If there are no tasks to be distributed at decision step 108, the process may move to step 116, where outputs are integrated to perform composite tasks. This integration may allow the system to combine results from various atomic agents to achieve the overall computational objective.

Finally, step 118 may involve storing aggregated results on electronic storage media. This storage may be performed securely, ensuring that final results remain protected.

The secure multi-agent system, as outlined by method 100, may provide a comprehensive framework for privacy-preserving distributed computation. By incorporating various security measures at each stage of the process, from task distribution to result aggregation, the system may maintain data integrity and confidentiality throughout the computation lifecycle.

Establishing a Secure Compute System

Figure 2:
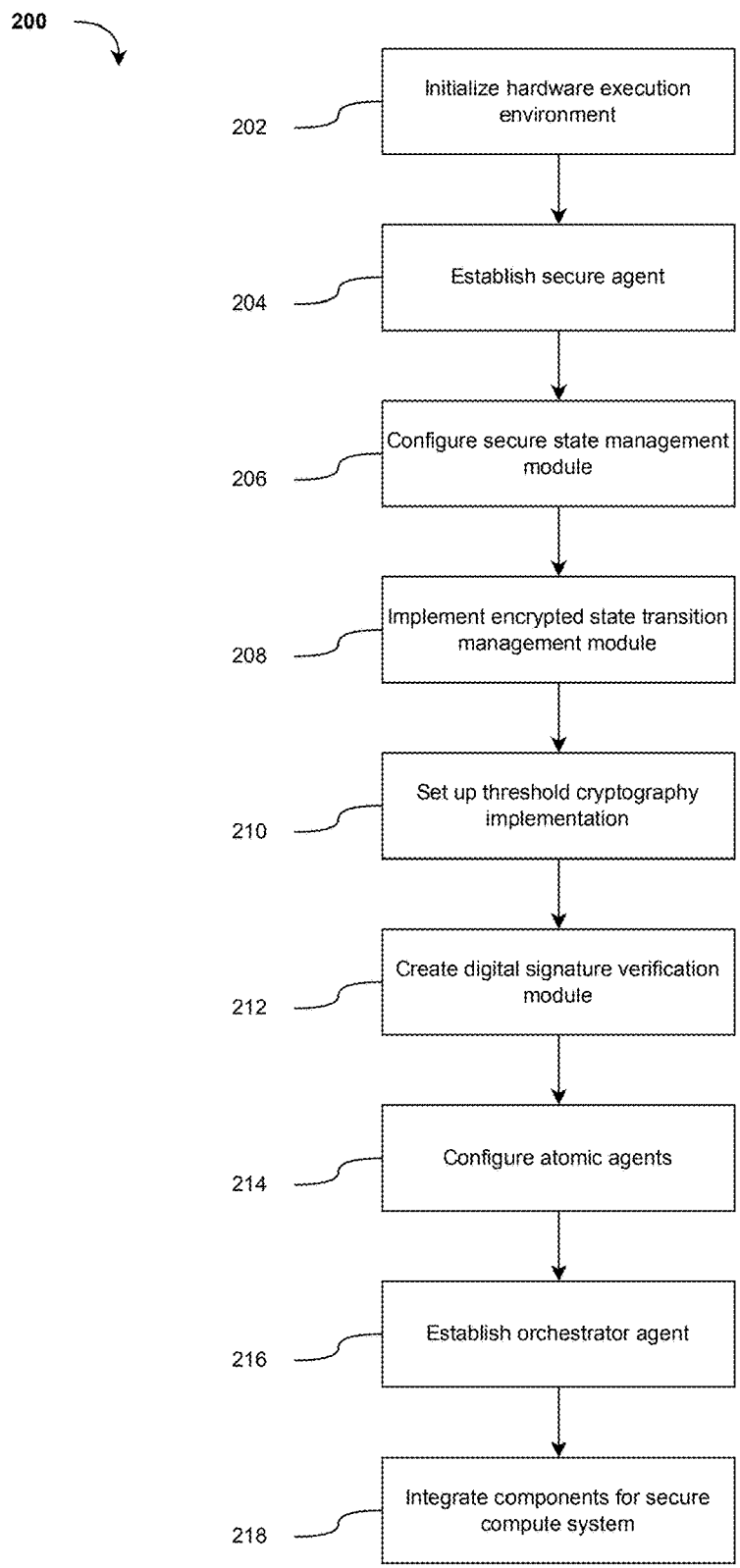
FIG. 2 illustrates a flowchart for a method of establishing a secure compute system using artificial intelligence agents, according to an embodiment.

FIG. 2 illustrates a flowchart for a method 200 of establishing a secure compute system using artificial intelligence agents. The method 200 comprises a series of steps for creating and configuring various components that form the secure compute system.

The method 200 begins with a step 202 of initializing a hardware execution environment. This hardware execution environment may include one or more processors, memory, and other computing resources necessary for executing the secure compute system.

In a step 204, a secure agent is established within the hardware execution environment. The secure agent may serve as the foundation for the secure compute system, providing security features and coordinating the activities of other components.

A step 206 involves configuring a secure state management module. This module may be responsible for encrypting and decrypting states of agents stored on electronic storage media. In some cases, the secure state management module may utilize a multisignature scheme that requires a threshold number of signatures from authorized blockchain addresses to access the encrypted state. This approach enhances security by distributing the authority to access sensitive information across multiple parties.

The method 200 continues with a step 208 of implementing an encrypted state transition management module. This module may interface with the secure state management module and be responsible for managing the secure transfer of agent states between different components of the system. In some cases, the encrypted state transition management module may encrypt the state of an agent before transmission to another agent using a symmetric encryption algorithm. The module may also decrypt received encrypted states from other agents using the corresponding symmetric decryption algorithm and a shared key. This approach helps maintain the confidentiality and integrity of agent states during transmission.

A step 210 involves setting up a threshold cryptography implementation for distributed key management. This implementation may interface with the secure state management module to split encryption keys into shares. By distributing key shares among multiple parties, the system can enhance security and resilience against potential compromises.

In a step 212, a digital signature verification module is created. This module may communicate with the threshold cryptography implementation to verify the authenticity of signatures provided by blockchain addresses during the key reconstruction process. By verifying signatures, the system can ensure that only authorized parties are able to participate in sensitive operations.

The method 200 proceeds with a step 214 of configuring a plurality of atomic agents. Each atomic agent may be designed to perform a specific task that contributes to a larger composite task. These atomic agents form the building blocks of the secure compute system, allowing for modular and distributed processing of complex operations.

A step 216 involves establishing an orchestrator agent. The orchestrator agent may be responsible for coordinating the secure execution of the atomic agents. This agent may manage task distribution, result aggregation, and overall workflow management to ensure that composite tasks are completed efficiently and securely.

The method 200 concludes with a step 218 of integrating the various components to form the complete secure compute system. This integration step may involve establishing communication channels, setting up security protocols, and ensuring that components work together seamlessly to achieve the system's objectives.

By following this method 200, a secure compute system can be established that leverages artificial intelligence agents while maintaining robust security measures. The combination of encrypted state management, threshold cryptography, digital signature verification, and coordinated execution of atomic agents creates a flexible and secure environment for performing complex computational tasks.

Implementing Secure Communication in the AI Agent System

Figure 3:
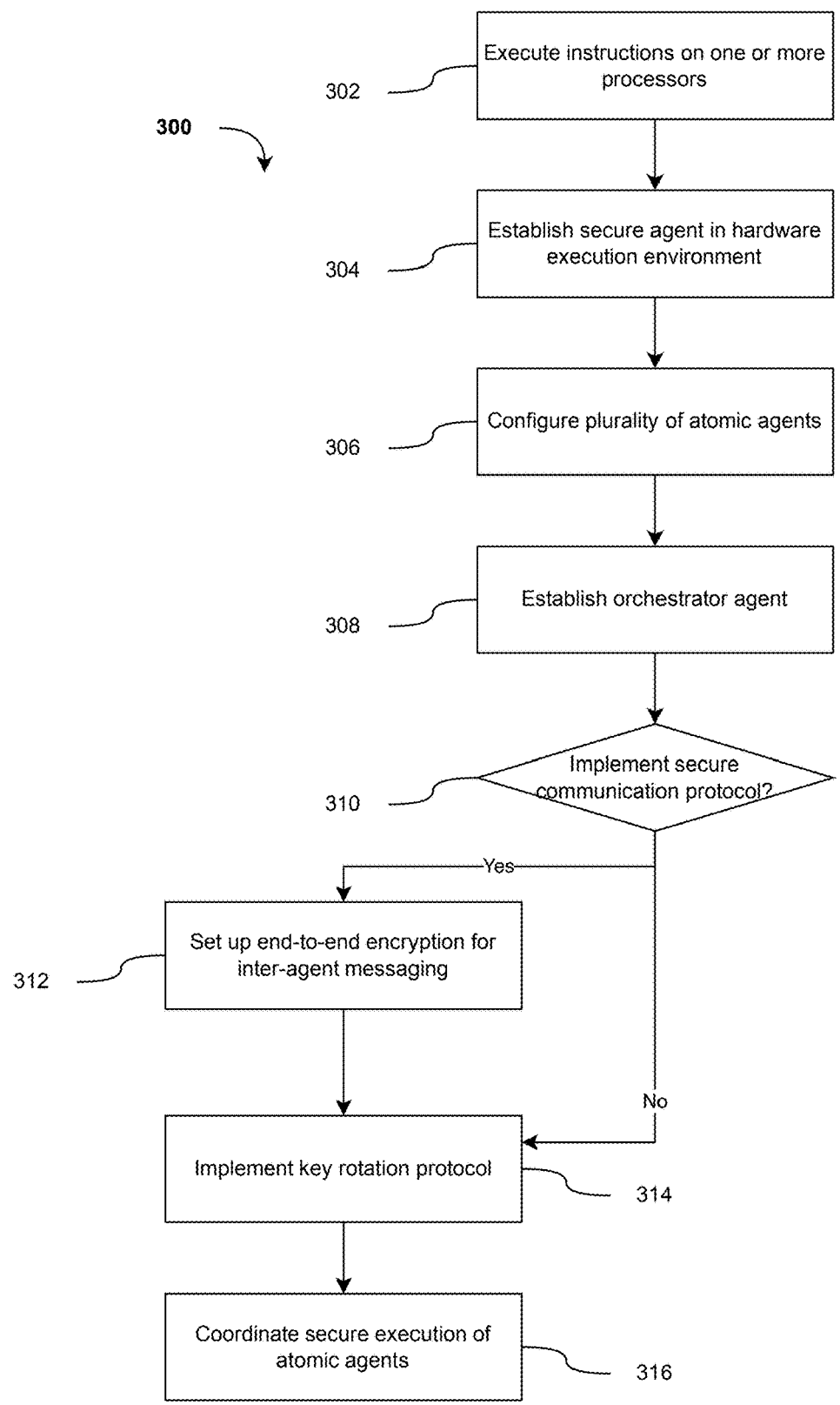
FIG. 3 illustrates a flowchart for a method of implementing secure communication in an artificial intelligence agent system, according to aspects of the present disclosure.

FIG. 3 illustrates a flowchart for a method 300 of implementing secure communication in an artificial intelligence agent system. The method 300 may provide a comprehensive approach to establishing and maintaining secure communication channels between various components of the AI agent system.

The method 300 may begin with a step 302, where instructions are executed on one or more processors. These instructions may initiate the process of setting up the secure communication infrastructure for the AI agent system.

In a step 304, a secure agent may be established in a hardware execution environment. The secure agent may serve as the foundation for implementing secure communication protocols throughout the system.

The method 300 may proceed with a step 306, where a plurality of atomic agents are configured. These atomic agents may be specialized computational units designed to perform specific tasks within the AI system while adhering to strict security protocols.

In a step 308, an orchestrator agent may be established. The orchestrator agent may be responsible for coordinating the activities of the atomic agents and managing the overall workflow of the AI system.

The method 300 may then reach a decision step 310, which determines if a secure communication protocol should be implemented. This decision may be based on various factors such as the sensitivity of the data being processed, regulatory requirements, or system-wide security policies.

If the decision is made to implement a secure communication protocol, the method 300 may proceed to a step 312. In the step 312, end-to-end encryption may be set up for inter-agent messaging. This end-to-end encryption may ensure that messages exchanged between agents remain confidential and cannot be intercepted or tampered with by unauthorized parties.

The secure communication protocol implemented in the step 312 may include several components to enhance security and privacy. In some cases, the protocol may incorporate a nonce generated using a cryptographically secure random number generator or a millisecond-precision timestamp. This nonce may help prevent replay attacks and ensure the freshness of each communication.

Additionally, the secure communication protocol may include a key exchange mechanism with support for region-specific encryption algorithms. This feature may allow the system to adapt to different regulatory requirements and cryptographic standards across various geographical regions.

To further enhance security, the protocol may implement data localization features. These features may utilize a distributed hash table for peer discovery and a content-addressed networking protocol for message routing. This approach may help ensure that sensitive data remains within specified geographical boundaries while facilitating efficient communication between agents.

The secure communication protocol may also incorporate a message authentication code. This code may provide integrity verification for the messages exchanged between agents, ensuring that they have not been altered during transmission.

In some cases, the secure communication protocol may include a fallback mechanism for secure local-only communication. This fallback mechanism may utilize a local mesh network protocol, allowing agents to maintain secure communication even in scenarios where standard network infrastructure may be unavailable or compromised.

After implementing the secure communication protocol, or if the decision is made not to implement such a protocol, the method 300 may proceed to a step 314. In the step 314, a key rotation protocol may be implemented. This key rotation protocol may involve periodically generating and distributing new encryption keys to maintain the long-term security of the system.

The method 300 may conclude with a step 316, where secure execution of atomic agents is coordinated. This coordination may involve leveraging the established secure communication protocols to manage task distribution, result aggregation, and overall system workflow while maintaining a high level of security and privacy.

By following the method 300, the AI agent system may establish a robust and flexible secure communication infrastructure. This infrastructure may enable confidential and tamper-resistant information exchange between agents, adapt to various regional requirements, and maintain security even in challenging network conditions.

Dynamic Compliance Monitoring in the AI Agent System

Figure 4:
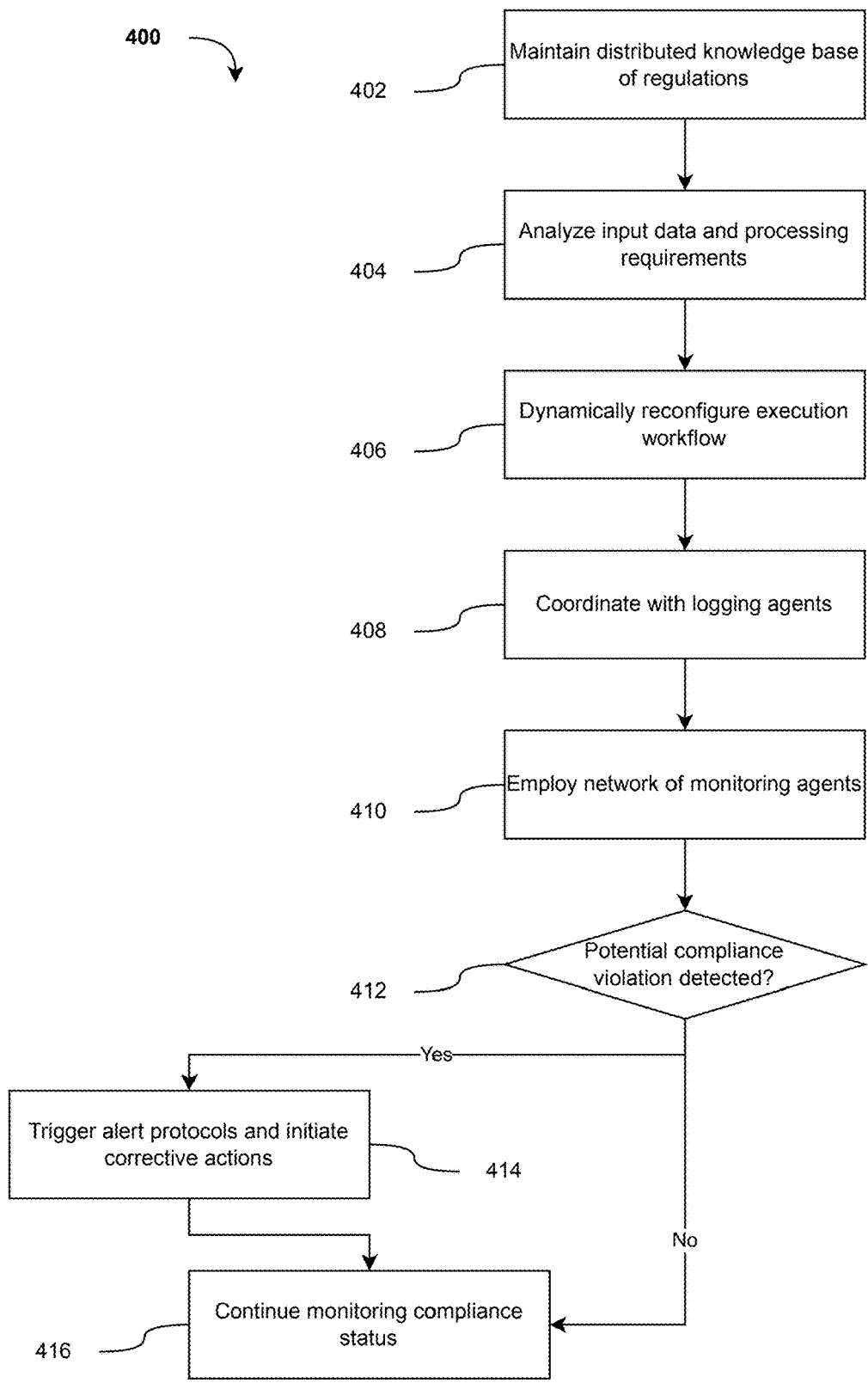
FIG. 4 illustrates a flowchart for a method of implementing dynamic compliance monitoring in an artificial intelligence agent system, according to an embodiment.

FIG. 4 illustrates a flowchart for a method 400 of implementing dynamic compliance monitoring in an artificial intelligence agent system. The method 400 may provide a comprehensive approach to ensuring regulatory compliance across multiple jurisdictions while maintaining the flexibility and efficiency of distributed AI processing.

The method 400 begins with a step 402 of maintaining a distributed knowledge base of regulations. In some cases, this knowledge base may be implemented as a repository of data sovereignty regulations for multiple jurisdictions. The distributed nature of the knowledge base may allow for efficient updates and access across the AI agent network.

In some cases, specialized atomic agents may be responsible for updating and validating regulatory information for specific jurisdictions. These specialized agents may continuously monitor regulatory changes, ensuring that the knowledge base remains current and accurate.

The method 400 continues with a step 404 of analyzing input data and processing requirements. This analysis may be performed by a compliance analysis agent that interfaces with the regulatory knowledge base. The compliance analysis agent may examine the nature of the input data, the proposed processing operations, and the relevant jurisdictional requirements to determine the appropriate compliance measures.

In a step 406, the execution workflow may be dynamically reconfigured. This reconfiguration may involve instructing task distribution and routing agents to allocate computations and data flows through sovereign-compliant atomic agents and environments. By dynamically adjusting the execution workflow, the system may ensure that data and computations are routed through appropriate sovereign-compliant environments, maintaining compliance with varying regulatory requirements.

The method 400 proceeds with a step 408 of coordinating with logging agents. These logging agents may be responsible for generating audit trails of data movements and processing activities across the distributed agent ecosystem. The coordination with logging agents may ensure comprehensive tracking of data flows and processing locations, which may be used for demonstrating compliance with data sovereignty regulations.

In a step 410, a network of monitoring agents may be employed. These monitoring agents may continuously assess the compliance status of the system, providing real-time oversight of operations.

The method 400 then reaches a decision step 412, which determines if a potential compliance violation is detected. If a violation is detected, the process may move to a step 414, where alert protocols are triggered and corrective actions are initiated. These corrective actions may include halting specific processes, rerouting data flows, or initiating additional security measures to address the potential violation.

If no violation is detected at the decision step 412, or after completing the step 414, the process may continue to a step 416, where compliance status monitoring continues. This ongoing monitoring may ensure that the system remains compliant even as regulatory requirements or operational conditions change.

The dynamic compliance module, as implemented through the method 400, may provide a robust framework for maintaining regulatory compliance in a complex, distributed AI system. By continuously monitoring regulations, analyzing requirements, and dynamically adjusting workflows, the system may adapt to changing regulatory landscapes while maintaining operational efficiency.

In some cases, the orchestrator agent may implement the dynamic compliance module, integrating compliance monitoring and enforcement into the overall coordination of the AI agent system. This integration may allow for seamless incorporation of compliance requirements into task distribution and execution processes.

The distributed nature of the knowledge base and the use of specialized atomic agents for regulatory updates may provide a scalable and flexible approach to managing compliance across multiple jurisdictions. This approach may be particularly valuable in scenarios where AI processing spans different regulatory environments, each with its own specific requirements for data handling and privacy.

The generation of comprehensive audit logs and trails may provide a valuable resource for demonstrating compliance to regulatory authorities. These logs may capture detailed information about data flows, processing locations, and decision-making processes, offering transparency and accountability in the system's operations.

By employing a network of monitoring agents, the system may achieve continuous, real-time compliance assessment. These agents may work in concert to identify potential issues before they escalate into violations, allowing for proactive management of compliance risks.

The dynamic reconfiguration of execution workflows may represent a feature of the compliance module. This capability may allow the system to adapt to changing regulatory requirements or to route sensitive data through compliant processing environments without disrupting overall system operations.

In summary, the dynamic compliance monitoring method 400 may provide a comprehensive, adaptive approach to managing regulatory compliance in a distributed AI agent system. By integrating compliance considerations into aspects of system operation, from task distribution to audit logging, the method 400 may enable the development of AI systems that can operate effectively across diverse regulatory environments while maintaining strict adherence to data sovereignty and privacy requirements.

Detailed Sequence of Interactions in the Secure AI Agent System

Figure 5:
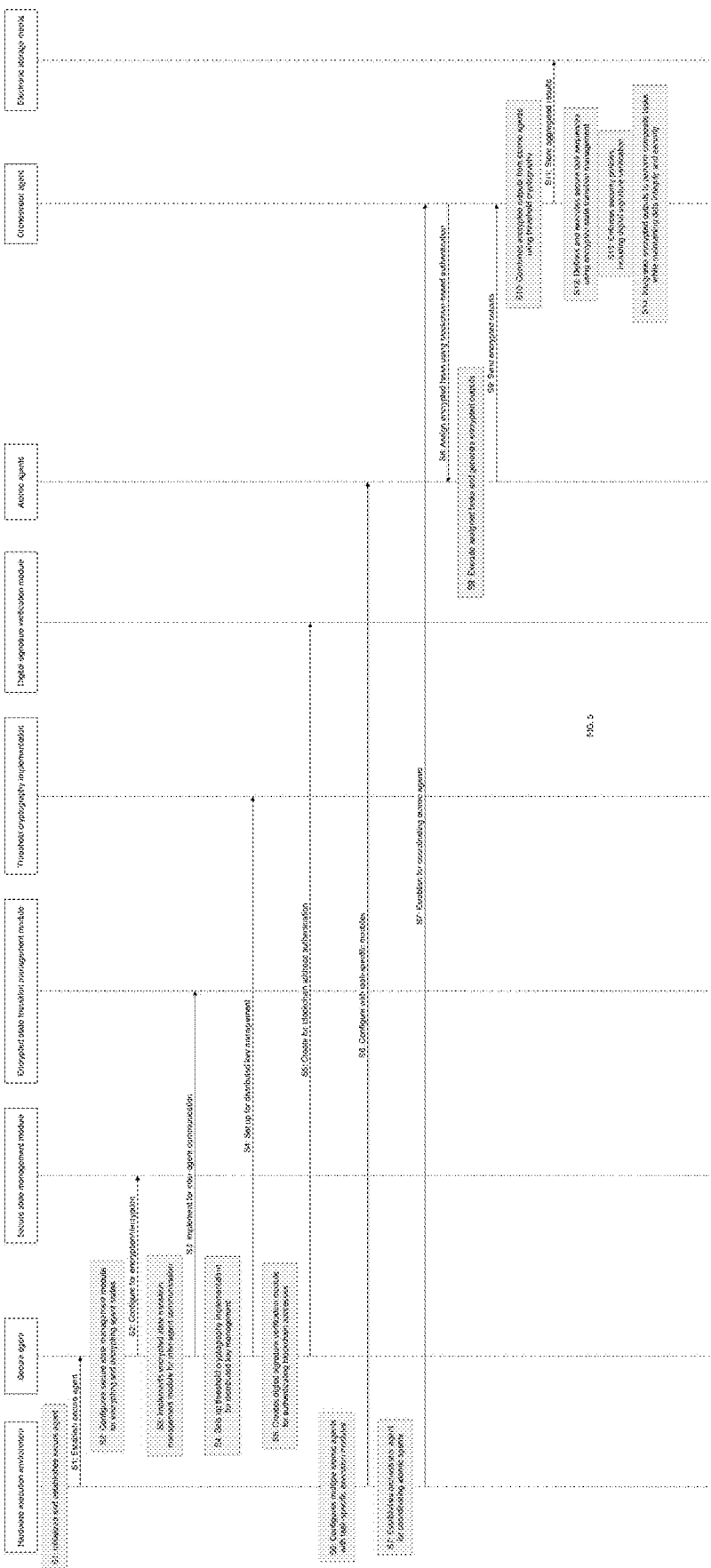
FIG. 5 illustrates a sequence diagram of interactions between components in a secure AI agent system, according to aspects of the present disclosure.

FIG. 5 illustrates a detailed sequence diagram showing the interactions between components in a secure AI agent system. The diagram depicts a series of steps that outline the flow of operations and communications between different modules within the system.

A step S1 may involve the Hardware Execution Environment initializing and establishing a Secure Agent. This step may set up the foundational security infrastructure for the system.

In a step S2, the Secure Agent may configure a Secure State Management Module. This module may be responsible for encrypting and decrypting agent states, ensuring data privacy throughout the computation process.

A step S3 may involve implementing an Encrypted State Transition Management Module. This module may interface with the Secure State Management Module and may be responsible for managing secure transfers of agent states between different components of the system.

In a step S4, the system may set up a Threshold Cryptography Implementation for distributed key management. This implementation may interface with the Secure State Management Module to split encryption keys into shares, enhancing security and resilience against potential compromises.

A step S5 may involve creating a Digital Signature Verification Module. This module may communicate with the Threshold Cryptography Implementation to verify the authenticity of signatures provided by blockchain addresses during the key reconstruction process.

In a step S6, the system may configure multiple Atomic Agents with task-specific execution modules. These Atomic Agents may form the building blocks of the secure compute system, allowing for modular and distributed processing of complex operations.

A step S7 may establish an Orchestrator Agent for coordinating the secure execution of the Atomic Agents. The Orchestrator Agent may manage task distribution, result aggregation, and overall workflow to ensure that composite tasks are completed efficiently and securely.

In a step S8, the Orchestrator Agent may assign encrypted tasks to Atomic Agents using blockchain-based authentication. This step may ensure that task details remain confidential during distribution.

A step S9 may involve the Atomic Agents executing their assigned tasks and generating encrypted outputs. Each Atomic Agent may perform its designated subtask while adhering to the system's security protocols.

In a step S10, the Orchestrator Agent may receive encrypted outputs from multiple Atomic Agents using a secure communication protocol with end-to-end encryption. This protocol may ensure that the outputs remain confidential during transmission.

A step S11 may involve the Orchestrator Agent decrypting the received outputs using the Secure State Management Module. During this process, the Orchestrator Agent may verify the integrity of the encrypted data and execute region-appropriate cryptographic algorithms to ensure compliance with local regulations.

In a step S12, the Orchestrator Agent may integrate the decrypted outputs to perform a composite task. This integration process may include analyzing and combining data from multiple Atomic Agents, applying task-specific algorithms to process the combined data, and resolving any conflicts or inconsistencies between outputs from different Atomic Agents.

A step S13 may involve the Orchestrator Agent re-encrypting the integrated result using a threshold encryption scheme. This step may ensure that the final composite result remains secure and can only be accessed by authorized parties.

In a step S14, the Orchestrator Agent may update a global encrypted state in the Secure State Management Module. This update may reflect the latest state of the system after completing the composite task.

The sequence diagram in FIG. 5 may illustrate how the Orchestrator Agent coordinates the process, from task distribution to result aggregation, while maintaining a high level of security and privacy. By leveraging asymmetric encryption for receiving encrypted outputs and implementing secure multiparty computation protocols for distributing encrypted task results, the system may ensure end-to-end security throughout the computation lifecycle.

In some cases, the Orchestrator Agent may employ digital signatures to verify the authenticity of outputs received from Atomic Agents. This verification process may add an additional layer of security, ensuring that only authorized Atomic Agents contribute to the composite task.

The system may utilize various cryptographic techniques to maintain data integrity and confidentiality. For example, the Secure State Management Module may employ different encryption algorithms depending on the specific requirements of each region or jurisdiction where the system operates.

By following this detailed sequence of interactions, the secure AI agent system may provide a robust framework for privacy-preserving distributed computation. The combination of encrypted state management, threshold cryptography, digital signature verification, and coordinated execution of Atomic Agents may create a flexible and secure environment for performing complex computational tasks while adhering to stringent security and privacy requirements.

Extended Sequence of Interactions with Key Rotation Protocol

Figure 6:
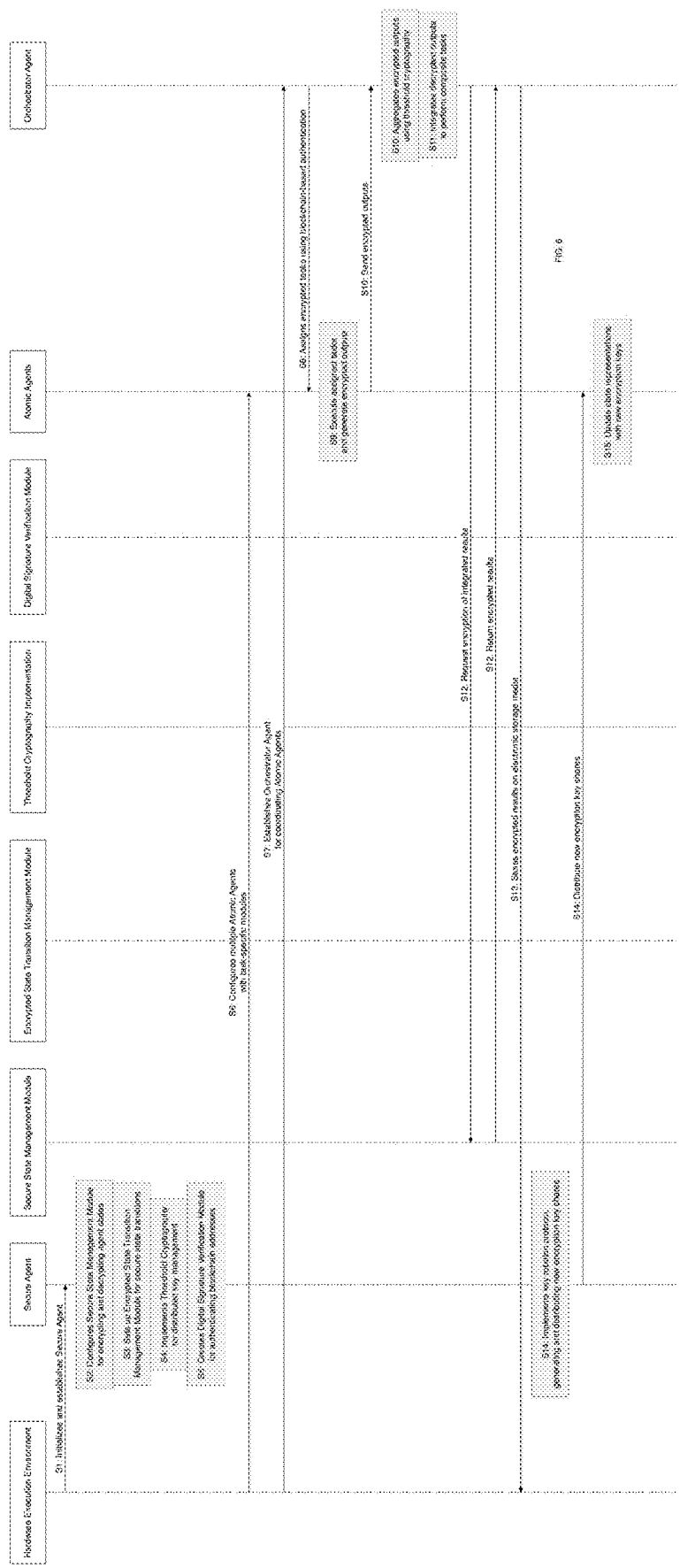
FIG. 6 illustrates another sequence diagram of interactions between components in a secure AI agent system, according to an embodiment.

FIG. 6 illustrates a detailed sequence diagram showing the extended interactions between key components of the secure AI agent system, including the implementation of a key rotation protocol. This diagram expands upon the basic sequence of operations by incorporating additional steps related to key generation, distribution, and state representation updates.

The sequence begins with a step S1, where the Hardware Execution Environment initializes and establishes the Secure Agent. Following this, the Secure Agent executes a series of configuration steps (S2-S5) to set up various modules for secure operation.

In a step S6, multiple Atomic Agents are configured with task-specific modules. A step S7 establishes the Orchestrator Agent for coordinating Atomic Agents. The steps S8 and S9 involve the assignment and execution of encrypted tasks by the Orchestrator Agent and Atomic Agents, respectively.

The steps S10 and S11 show the Orchestrator Agent aggregating encrypted outputs using threshold cryptography and integrating decrypted outputs for composite tasks. The steps S12 and S13 handle the encryption request and return of integrated results, with S13 storing the encrypted results in electronic storage media.

The key rotation protocol is implemented in the final sequence (S14-S15) of FIG. 6. In a step S14, the Secure Agent generates new encryption keys and distributes them to the associated Atomic Agents. This step may involve several sub-processes:

1. The Secure Agent may use a cryptographically secure random number generator to create new encryption keys.
2. The new keys may be split into shares using a threshold secret sharing scheme.
3. The key shares may be distributed to blockchain addresses associated with the Atomic Agents, utilizing the secure communication protocol of the agent framework.

The key rotation protocol may establish a transition period where both the old and new encryption keys are valid. This approach may allow for a smooth transition without disrupting ongoing operations.

In some cases, the key rotation protocol may involve re-encrypting the weights of the input privacy layer using the new encryption key. This process may ensure that all sensitive data is protected under the new cryptographic scheme.

A step S15 shows the Atomic Agents updating their state representations with the new encryption keys. This step may include:
1. Verifying the authenticity of the received key shares.
2. Reconstructing the new encryption key from the received shares.
3. Updating internal data structures to use the new key for future operations.

The secure state management module may implement the key rotation protocol as part of its overall responsibility for managing encrypted agent states. By periodically rotating encryption keys, the system may enhance its long-term security posture and reduce the risk of key compromise.

An aspect of the key rotation protocol may be the secure destruction of old encryption keys and their shares after the transition period. This process may be coordinated by the Orchestrator Agent to ensure that all components of the system have successfully transitioned to the new keys before the old ones are permanently removed.

The extended sequence diagram in FIG. 6 illustrates how the key rotation protocol integrates with the existing secure AI agent system. By incorporating regular key rotations, the system may maintain a high level of security even as it processes large volumes of sensitive data over extended periods.

Architecture of the Secure Agent System

Figure 7:
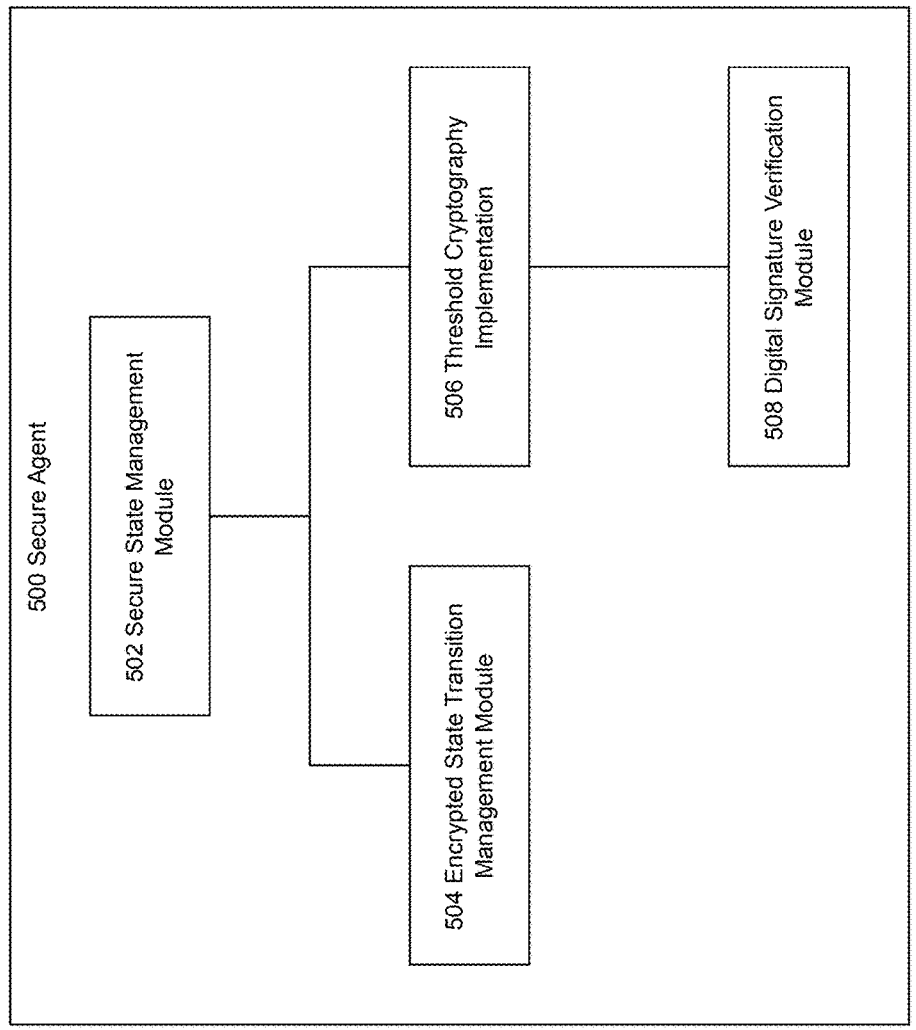
FIG. 7 illustrates a block diagram of a secure agent system, according to aspects of the present disclosure.

FIG. 7 illustrates a block diagram of a secure agent system 500. The secure agent system 500 may provide a comprehensive framework for privacy-preserving distributed computation using artificial intelligence agents. The secure agent system 500 may include several key components that work together to ensure data integrity, confidentiality, and secure communication between agents.

At the core of the secure agent system 500 is a state management module 502. The state management module 502 may be responsible for encrypting and decrypting the states of various agents within the system. In some cases, the state management module 502 may utilize a multisignature scheme that requires a threshold number of signatures from authorized blockchain addresses to access the encrypted state. This approach may enhance security by distributing the authority to access sensitive information across multiple parties.

Connected to the state management module 502 is a state transition module 504. The state transition module 504 may be responsible for managing the secure transfer of agent states between different components of the system. In some cases, the state transition module 504 may encrypt the state of an agent before transmission to another agent using a symmetric encryption algorithm. The state transition module 504 may also decrypt received encrypted states from other agents using the corresponding symmetric decryption algorithm and a shared key.

To ensure the integrity of state transitions, the state transition module 504 may employ a cryptographic hash function. In some cases, the state transition module 504 may verify the integrity of decrypted states by generating a hash value and comparing it with a previously stored hash value. This comparison may allow the system to detect any modifications that may have occurred during transmission.

In some cases, if the integrity verification fails or after a predetermined number of state transitions, the state transition module 504 may initiate a secure key exchange protocol. This protocol may establish a new shared symmetric key, further enhancing the security of state transitions within the system.

The secure agent system 500 also includes a cryptography module 506. The cryptography module 506 may implement threshold cryptography for distributed key management. In some cases, the cryptography module 506 may interface with the state management module 502 to split encryption keys into shares. By distributing key shares among multiple parties, the system may enhance security and resilience against potential compromises.

Connected to the cryptography module 506 is a signature verification module 508. The signature verification module 508 may be responsible for authenticating blockchain addresses during key reconstruction processes. By verifying signatures, the system may ensure that only authorized parties are able to participate in sensitive operations.

The secure agent system 500 may also include multiple atomic agents, although not explicitly shown in FIG. 7. Each atomic agent may be designed to perform a specific task that contributes to a larger composite task. In some cases, each atomic agent may comprise a task-specific execution module configured to perform a designated computational task. Additionally, each atomic agent may include a state management interface for securely interacting with the state management module 502, and a communication module for exchanging encrypted messages with other agents.

To coordinate the activities of the atomic agents, the secure agent system 500 may incorporate an orchestrator agent. While not explicitly depicted in FIG. 7, the orchestrator agent may play a role in managing the overall workflow of the system. In some cases, the orchestrator agent may comprise several key components:
1. A task distribution module for assigning encrypted tasks to atomic agents using blockchain-based authentication.
2. A result aggregation module for combining encrypted outputs from multiple atomic agents and storing the aggregated results.
3. A workflow management module for defining and executing secure task sequences using the state transition module 504.
4. A security policy enforcement module for ensuring compliance with system-wide security protocols, including digital signature verification using blockchain addresses.

The architecture of the secure agent system 500 may provide a robust framework for maintaining data privacy and security throughout the computation process. By incorporating various security measures at each stage, from state management to inter-agent communication, the system may maintain data integrity and confidentiality while enabling complex distributed computations.

Structure of an Atomic Agent

Figure 8:
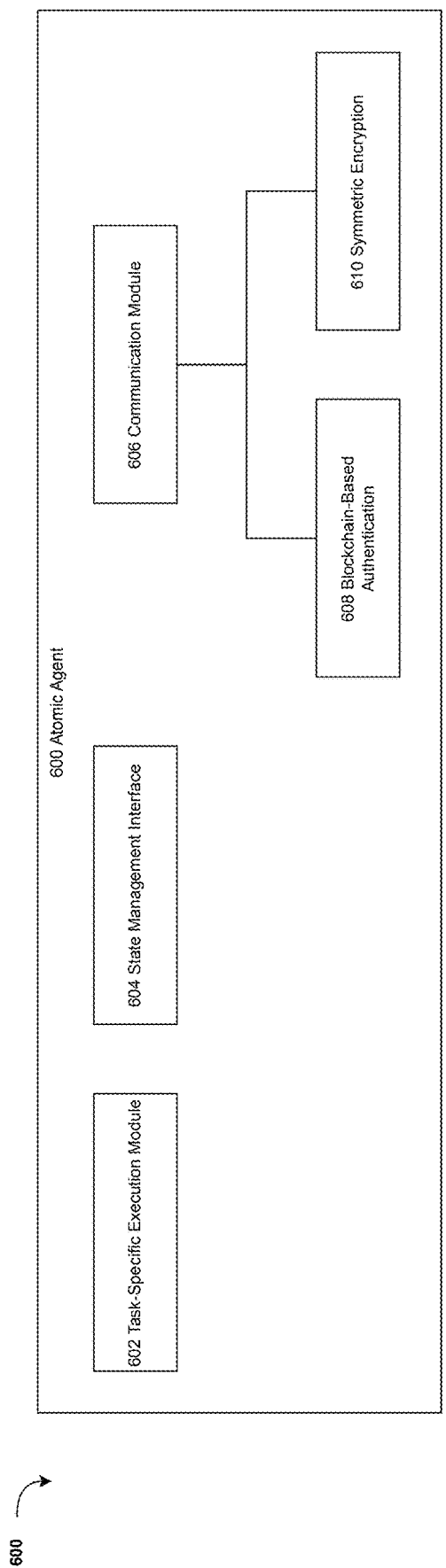
FIG. 8 illustrates a block diagram of an atomic agent system, according to an embodiment.

FIG. 8 illustrates a block diagram of an atomic agent system. The system shows an atomic agent 600 containing multiple modules arranged in a hierarchical structure.

The atomic agent 600 may include three main modules positioned horizontally at the top level: a task-specific execution module 602, a state management interface 604, and a communication module 606. The task-specific execution module 602 may be positioned on the left side, while the state management interface 604 may be located in the center, and the communication module 606 may be placed on the right side.

The task-specific execution module 602 may be configured to perform designated computational tasks related to the overall composite task of the secure multi-agent system. In some cases, the task-specific execution module 602 may implement specialized algorithms or processing techniques tailored to a particular aspect of the larger computational problem.

The state management interface 604 may be responsible for securely interacting with the secure state management module of the system. In some cases, the state management interface 604 may utilize a multisignature scheme and threshold cryptography to ensure the integrity and confidentiality of the atomic agent's state information.

The communication module 606 may be designed for exchanging encrypted messages with other agents in the system. The communication module 606 may connect to two sub-modules positioned below it: a blockchain-based authentication module 608 and a symmetric encryption module 610. These sub-modules may be arranged horizontally at the same level, with the authentication module 608 on the left and the encryption module 610 on the right.

The blockchain-based authentication module 608 may be responsible for verifying the authenticity of messages and ensuring that communications are coming from authorized sources within the system. In some cases, the authentication module 608 may utilize blockchain technology to provide a decentralized and tamper-resistant method of authentication.

The symmetric encryption module 610 may handle the encryption and decryption of messages exchanged between agents. In some cases, the encryption module 610 may employ symmetric encryption algorithms to provide efficient and secure communication within the system.

In some cases, the atomic agent 600 may include a data localization agent. The data localization agent may be responsible for managing data in compliance with various sovereign data regulations. The data localization agent may identify data elements that are subject to specific regional or national data sovereignty requirements.

Once identified, the data localization agent may segregate these data elements into region-specific storage containers. This segregation may ensure that sensitive or regulated data remains within the appropriate geographical or jurisdictional boundaries as required by law.

The data localization agent may apply region-specific encryption schemes to the segregated data. In some cases, these encryption schemes may be tailored to meet the specific cryptographic standards or requirements of different jurisdictions. By applying region-specific encryption, the data localization agent may enhance the security and compliance of the atomic agent's data handling processes.

The modules within the atomic agent 600 may be represented as rectangular blocks within the larger rectangular boundary of the atomic agent 600. The connections between the communication module 606 and its sub-modules may be shown by vertical lines, indicating the hierarchical relationship and information flow between these components.

By incorporating these various modules and functionalities, the atomic agent 600 may provide a flexible and secure building block for distributed computation within the larger secure multi-agent system. The atomic agent's structure may allow for specialized task execution while maintaining robust security measures and compliance with data sovereignty regulations.

Orchestrator Agent System and its Interactions

Figure 9:
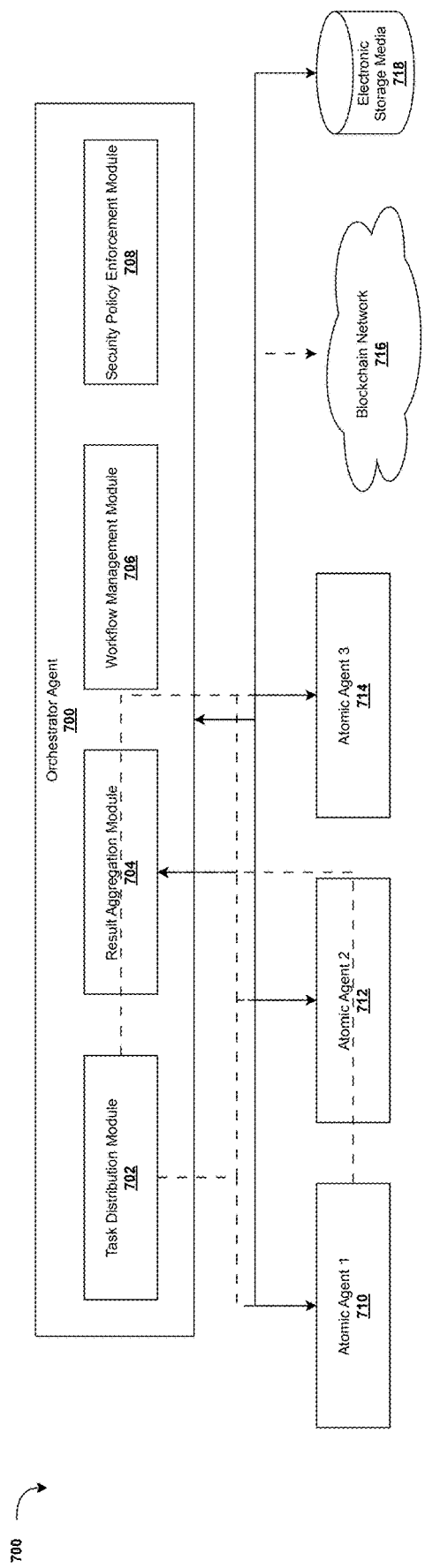
FIG. 9 illustrates a system diagram of an orchestrator agent system, according to aspects of the present disclosure.

FIG. 9 illustrates a system diagram of an orchestrator agent system. The system includes an orchestrator agent 700 positioned at the top of the diagram. The orchestrator agent 700 may be responsible for coordinating the activities of multiple atomic agents and managing the overall workflow of the secure compute system.

The orchestrator agent 700 may comprise several key modules arranged horizontally within its structure. These modules may include a task distribution module 702, a result aggregation module 704, a workflow management module 706, and a security policy enforcement module 708.

The task distribution module 702 may be responsible for assigning encrypted tasks to atomic agents using blockchain-based authentication. In some cases, the task distribution module 702 may utilize cryptographic techniques to ensure that task details remain confidential during the distribution process.

The result aggregation module 704 may be designed to combine encrypted outputs from multiple atomic agents. This module may employ threshold cryptography techniques to aggregate results while maintaining data confidentiality. In some cases, the result aggregation module 704 may interface with electronic storage media 718 to store the aggregated results securely.

The workflow management module 706 may be responsible for defining and executing secure task sequences. This module may utilize the encrypted state transition management capabilities of the secure agent system to manage the flow of operations across multiple atomic agents.

The security policy enforcement module 708 may ensure compliance with system-wide security protocols. This module may incorporate digital signature verification using blockchain addresses to authenticate the identity of atomic agents and other system components.

Below the orchestrator agent 700, the system includes three atomic agents: a first atomic agent 710, a second atomic agent 712, and a third atomic agent 714. These atomic agents may be arranged horizontally and connected to the modules of the orchestrator agent 700 through communication paths.

The task distribution module 702 may connect to the atomic agents through downward communication paths, allowing for the secure assignment of tasks. The result aggregation module 704 may receive upward connections from the atomic agents, enabling the collection of encrypted outputs.

The workflow management module 706 may maintain connections with the atomic agents for process coordination. These connections may allow the orchestrator agent 700 to manage the sequence of operations performed by the atomic agents in a secure and efficient manner.

On the right side of the diagram, a blockchain network 716 may be represented. The blockchain network 716 may be connected to the system through communication paths, potentially interfacing with the security policy enforcement module 708 for authentication and verification purposes.

Adjacent to the blockchain network 716, electronic storage media 718 may be depicted. The storage media 718 may serve as a secure repository for storing aggregated results and other sensitive data processed by the system.

The orchestrator agent 700 may incorporate a privacy budget tracking component as part of its secure state management capabilities. This component may be responsible for monitoring and managing the privacy budget throughout the system's operations.

In some cases, the privacy budget tracking component may monitor cumulative privacy loss across multiple operations. This monitoring may involve tracking the amount of noise added to data during processing and calculating the overall impact on data privacy.

The privacy budget tracking component may adjust noise addition in the input privacy layer based on the current privacy budget. As the privacy budget decreases, the component may increase the amount of noise added to maintain an appropriate level of privacy protection.

In some cases, when the privacy budget reaches a predetermined threshold or becomes exhausted, the privacy budget tracking component may halt further operations. This precautionary measure may prevent excessive information leakage and maintain the overall privacy guarantees of the system.

The integration of the privacy budget tracking component within the orchestrator agent 700 may allow for centralized management of privacy considerations across all atomic agents and operations within the secure compute system. This centralized approach may ensure consistent application of privacy protection measures throughout the distributed computation process.

Secure Communication Protocol System

Figure 10:
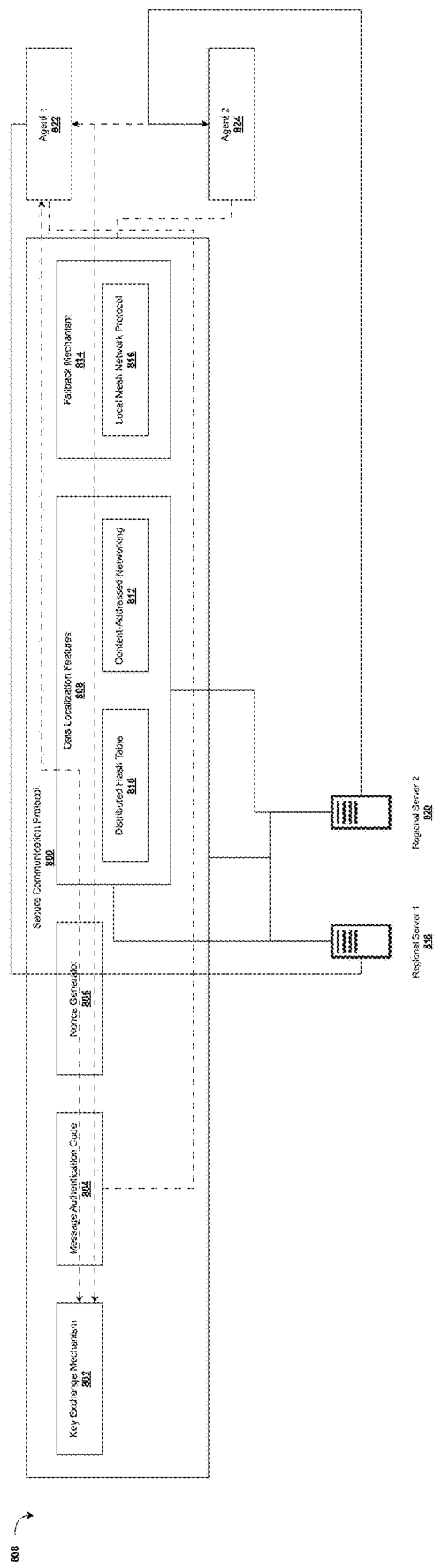
FIG. 10 illustrates a block diagram of a secure communication protocol system, according to an embodiment.

FIG. 10 illustrates a block diagram of a secure communication protocol system 800. The secure communication protocol system 800 may provide a comprehensive framework for ensuring secure and privacy-preserving communication between computing agents while adhering to data sovereignty regulations.

At the core of the secure communication protocol system 800 is a key exchange mechanism 802. The key exchange mechanism 802 may be responsible for establishing shared secret keys between agents. In some cases, the key exchange mechanism 802 may support region-specific encryption algorithms to comply with local cryptographic standards.

Adjacent to the key exchange mechanism 802 is a message authentication code 804. The message authentication code 804 may provide integrity verification for messages exchanged within the system. In some cases, the message authentication code 804 may generate and verify cryptographic tags that accompany each message, ensuring that the message has not been tampered with during transmission.

The secure communication protocol system 800 also includes a nonce generator 806. The nonce generator 806 may produce unique values for each communication session or message. In some cases, the nonce generator 806 may use a cryptographically secure random number generator or a millisecond-precision timestamp to create these values, helping to prevent replay attacks and ensure the freshness of each communication.

A component of the secure communication protocol system 800 is the data localization features 808. The data localization features 808 may be designed to ensure that sensitive data remains within specified geographical boundaries while facilitating efficient communication between agents. The data localization features 808 contain two main components: a distributed hash table 810 and content-addressed networking 812.

The distributed hash table 810 may be used for peer discovery within the network. In some cases, the distributed hash table 810 may allow agents to locate and connect with other agents in a decentralized manner, without relying on a central authority.

The content-addressed networking 812 may be employed for message routing. In some cases, the content-addressed networking 812 may enable efficient and secure routing of messages based on their content rather than traditional network addresses, enhancing both privacy and performance.

The secure communication protocol system 800 includes a fallback mechanism 814 positioned on the right side of the data localization features 808. The fallback mechanism 814 may be designed to handle communication scenarios where standard routes are unavailable or compromised. The fallback mechanism 814 includes a local mesh network protocol 816 for maintaining secure communication in challenging network conditions.

Two regional servers are shown at the bottom of the diagram: a regional server 818 and a regional server 820. These regional servers may play a role in implementing the data localization features 808. In some cases, the regional servers 818 and 820 may act as secure gateways for routing messages within specific geographical regions, ensuring compliance with data sovereignty regulations.

The secure communication protocol system 800 interacts with two computing agents: a computing agent 822 and a computing agent 824. These computing agents may represent the endpoints of the secure communication, utilizing the various components of the system to exchange information securely.

In some cases, the secure communication protocol system 800 may transmit only a large matrix of Float 16s between regions. This approach may allow for efficient data transfer while maintaining privacy, as the Float 16 matrix may not be easily interpretable without the corresponding decryption keys and processing algorithms.

The architecture of the secure communication protocol system 800 may allow for arbitrage of compute between the base model and the privacy layer. In some cases, this may enable flexible allocation of computational resources, optimizing performance while maintaining security and compliance with data regulations.

The secure communication protocol system 800 may be designed to allow the privacy layer to be hosted in-region while the main model remains in a central cluster. This configuration may address data sovereignty concerns by keeping sensitive data processing within specified geographical boundaries, while still leveraging the computational power of a centralized model for non-sensitive operations.

By incorporating these various components and features, the secure communication protocol system 800 may provide a robust framework for maintaining data privacy, security, and compliance in distributed AI agent systems. The system's architecture may allow for flexible and efficient communication while adhering to stringent data protection and sovereignty requirements.

Privacy-Preserving Neural Network Architecture

Figure 11:
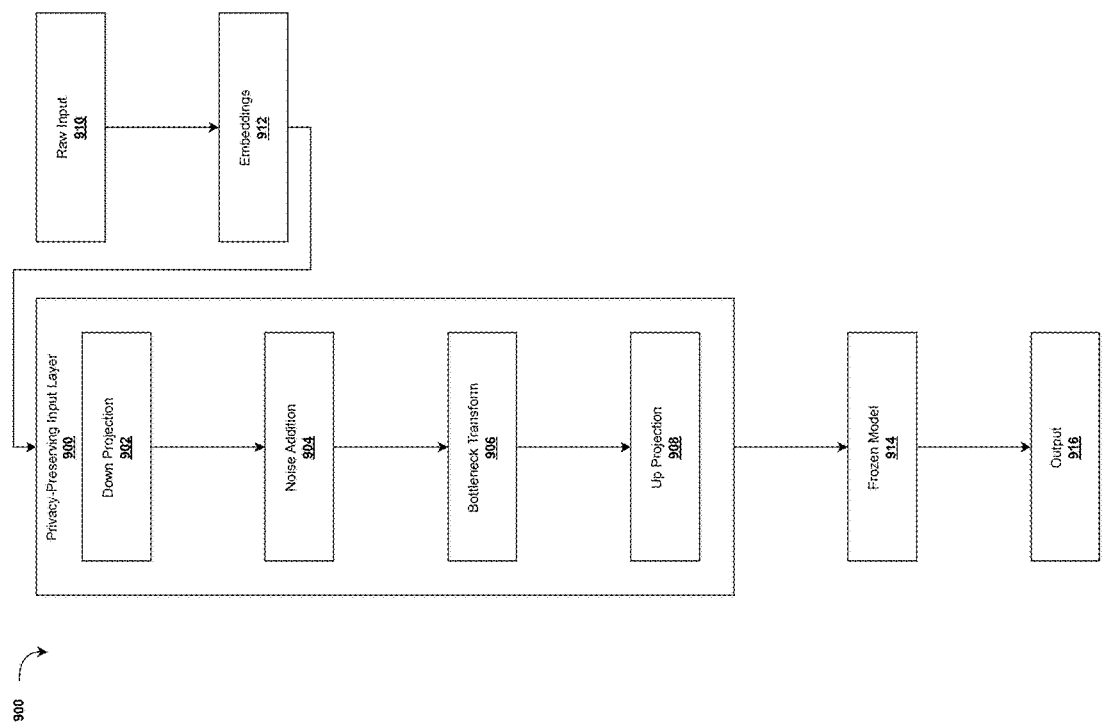
FIG. 11 illustrates a flowchart for a privacy-preserving neural network architecture, according to aspects of the present disclosure.

FIG. 11 illustrates a flowchart for a privacy-preserving neural network architecture 900. The architecture 900 may provide a comprehensive approach to maintaining data privacy while processing information through multiple stages of a neural network.

The architecture 900 may begin with an input module 910 that receives raw input data. In some cases, the input module 910 may preprocess the data to prepare it for further processing within the neural network.

From the input module 910, data may flow to an embedding module 912. The embedding module 912 may generate embeddings from the input data. These embeddings may represent the input data in a high-dimensional space, capturing semantic relationships and other relevant features.

After the embedding module 912, the data may enter a privacy layer 900. The privacy layer 900 may be a component in maintaining data privacy throughout the processing pipeline. In some cases, the privacy layer 900 may contain multiple sequential components designed to protect sensitive information while preserving useful features for downstream tasks.

Within the privacy layer 900, the data may first pass through a projection module 902. The projection module 902 may perform a down projection operation on the input dimensions. This down projection may reduce the dimensionality of the data, potentially obscuring individual data points while retaining overall patterns and relationships.

Following the projection module 902, the reduced-dimension data may flow to a noise module 904. The noise module 904 may add noise to the representation using differential privacy techniques. In some cases, the addition of noise may help prevent the extraction of individual data points from the aggregated representation, further enhancing privacy protections.

After noise addition, the data may move to a transform module 906. The transform module 906 may perform a bottleneck transformation on the noisy reduced-dimension data. This transformation may further process the data in a way that preserves privacy while maintaining useful features for the model's task.

The final component within the privacy layer 900 may be a projection unit 908. The projection unit 908 may project the data back to its original dimensionality. This up projection operation may restore the data to a form that can be used by subsequent layers of the neural network while maintaining the privacy protections applied in earlier stages.

The output from the privacy layer 900 may then flow to a model module 914. The model module 914 may process the privacy-preserved representations to perform the main computational task of the neural network. In some cases, the model module 914 may be based on readily available pretrained open source models, leveraging existing architectures while adding privacy protections.

To fine-tune the neural network for specific tasks or datasets, the system may use low-rank adaptation (LoRA) techniques. LoRA may allow for efficient adaptation of the pretrained model without modifying all of its parameters, potentially reducing computational requirements while improving task-specific performance.

Finally, the processed data may reach an output module 916. The output module 916 may generate the final output of the system based on the computations performed in the model module 914.

By incorporating the privacy layer 900 between the embedding module 912 and the model module 914, the architecture may maintain strong privacy guarantees while still allowing for effective data processing. The combination of dimensionality reduction, noise addition, and transformation operations within the privacy layer 900 may provide a robust approach to privacy-preserving neural network computations.

In some cases, the system may split off and retrain the last layer of the neural network. This approach may allow for fine-tuning of the model's output while maintaining the privacy protections applied in earlier layers. The retraining of the last layer may be performed using privacy-preserving techniques to ensure that the final output does not compromise the privacy guarantees established earlier in the processing pipeline.

The privacy-preserving neural network architecture 900 may provide a flexible framework for balancing data utility and privacy protection. By carefully designing each component of the privacy layer 900 and integrating it with existing neural network architectures, the system may enable privacy-preserving computations across a wide range of applications and domains.

Secure Model Storage System

Figure 12:
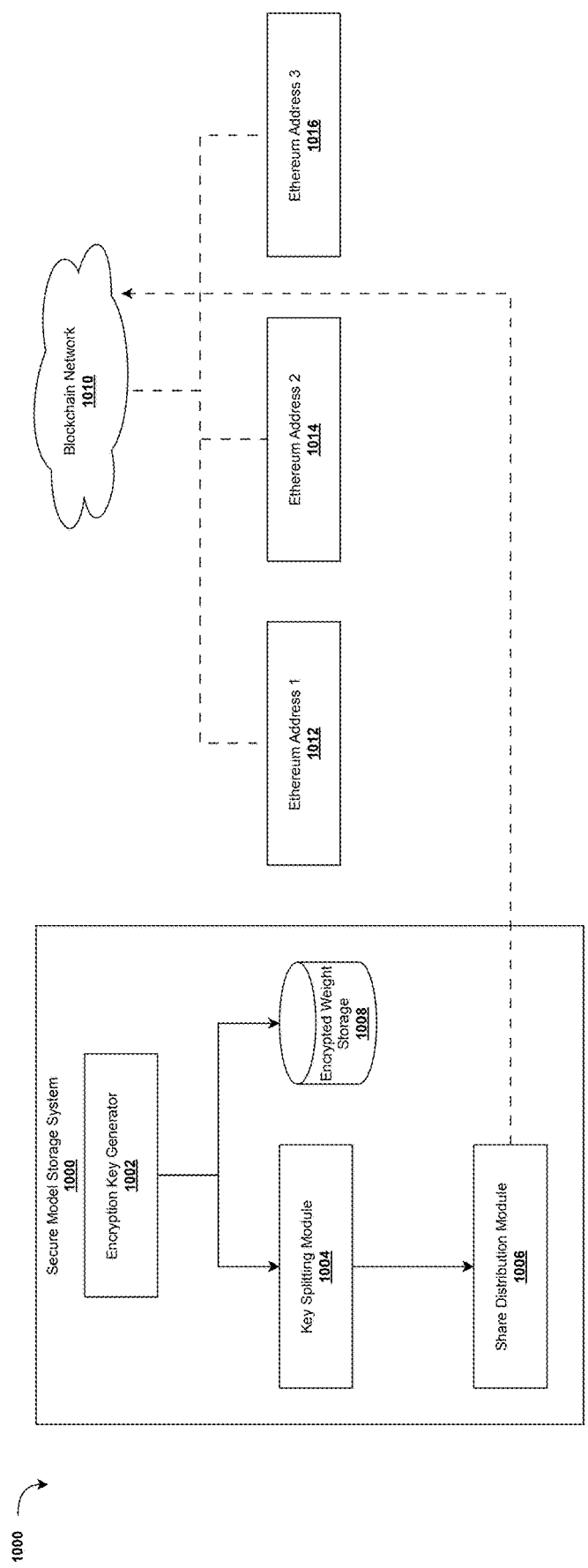
FIG. 12 illustrates a block diagram of a storage system for secure model storage, according to an embodiment.

FIG. 12 illustrates a block diagram of a storage system 1000 for secure model storage. The storage system 1000 may provide a comprehensive framework for securely storing and managing model weights while enabling cryptographic ownership of data and models.

At the core of the storage system 1000 is a key generator 1002 positioned at the top of the internal structure. The key generator 1002 may be responsible for generating cryptographic keys used to encrypt and secure the model weights. In some cases, the key generator 1002 may utilize advanced cryptographic algorithms to ensure the strength and uniqueness of the generated keys.

Connected to the key generator 1002 are two parallel branches: a splitting module 1004 on the left side and weight storage 1008 on the right side. The splitting module 1004 may be designed to implement a key splitting mechanism, which enhances the security of the system by distributing key information across multiple parties.

The splitting module 1004 connects to a distribution module 1006 positioned below it. The distribution module 1006 may be responsible for securely distributing the split key shares to various authorized parties within the system. This distribution process may involve complex protocols to ensure that key shares are transmitted securely and received only by authorized entities.

The weight storage 1008 is represented by a cylindrical shape, indicating a storage component for encrypted weights. In some cases, the weight storage 1008 may utilize advanced data structures and compression techniques to efficiently store large volumes of model weights while maintaining their security.

External to the storage system 1000, the diagram shows a blockchain network 1010 represented by a cloud-like shape in the upper right portion. The blockchain network 1010 may play a crucial role in ensuring the integrity and traceability of key management operations within the system.

Three address modules are arranged horizontally below the blockchain network 1010: address module 1012, address module 1014, and address module 1016. These address modules may represent different entities or nodes within the blockchain network that are authorized to participate in the key management and model access processes.

The distribution module 1006 connects to each of the address modules 1012, 1014, 1016 through dashed lines, indicating communication paths. These connections may enable secure distribution of key shares and facilitate cryptographic ownership of data and models by authorized parties.

In some cases, the storage system 1000 may implement a quantization process for the model weights before encryption and storage. This quantization may involve reducing the precision of weight values, typically from 32-bit floating-point numbers to lower-precision formats such as 16-bit or 8-bit integers. The quantization process may significantly reduce the storage requirements for model weights while maintaining acceptable model performance.

The quantized weights may be stored in the weight storage 1008, potentially allowing for more efficient use of storage resources. In some cases, the quantization process may be reversible, enabling the reconstruction of full-precision weights when needed for model inference or fine-tuning.

The storage system 1000 may enable zero-party activity inference models for users by leveraging the secure key management and distribution mechanisms. In this context, "zero-party" refers to data that is intentionally and proactively shared by users, giving them full control over their data and how it is used.

By utilizing the blockchain network 1010 and the associated address modules 1012, 1014, 1016, the storage system 1000 may provide a mechanism for users to cryptographically own their data and models. This ownership may be established through the association of encrypted model weights with specific blockchain addresses controlled by the users.

In some cases, the storage system 1000 may implement a multi-signature scheme for accessing encrypted model weights. This scheme may require a threshold number of signatures from authorized blockchain addresses to decrypt and access the model weights. The multi-signature approach may enhance security by distributing control over the model access among multiple parties.

The storage system 1000 may also incorporate privacy-preserving techniques to enable activity inference while protecting user privacy. These techniques may include differential privacy mechanisms, secure multi-party computation, or homomorphic encryption, allowing computations to be performed on encrypted data without revealing the underlying information.

By combining quantization, secure key management, blockchain-based ownership, and privacy-preserving computation techniques, the storage system 1000 may provide a robust framework for secure model storage. This system may enable users to maintain control over their data and models while allowing for efficient and privacy-preserving activity inference.

Figure 13:
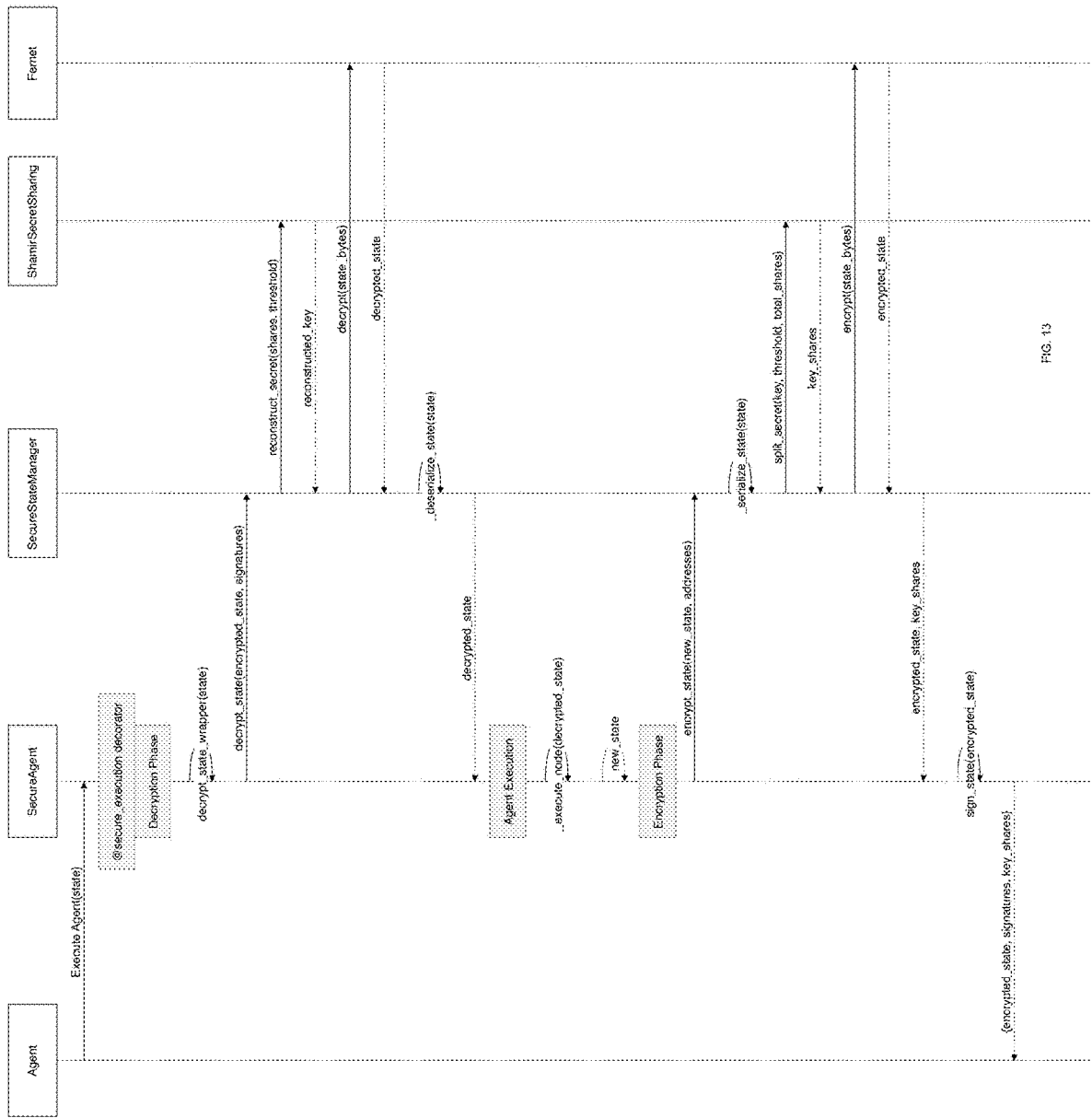
FIG. 13 illustrates a sequence diagram of secure execution flow between components in an AI agent system, according to aspects of the present disclosure.

FIG. 13 illustrates a detailed sequence diagram showing the secure execution flow between key components in the AI agent system. The diagram depicts the interactions between an Agent, SecureAgent, SecureStateManager, ShamirSecretSharing, and Fernet components, highlighting the process of secure state management, including encryption, decryption, secret sharing, and signature verification.

The sequence begins with the Agent initiating execution by calling Execute Agent (state). This action triggers a series of operations designed to ensure the security and privacy of the agent's state throughout the execution process.

Upon receiving the execution request, the SecureAgent enters a @secure_execution decorator phase. This decorator may serve as a wrapper around the agent's execution logic, providing an additional layer of security and control over the execution process.

Following the decorator phase, the SecureAgent initiates the Decryption Phase. During this phase, the SecureAgent calls the decrypt_state_wrapper (state) method. This method may be responsible for preparing the encrypted state for decryption and handling any necessary pre-processing steps.

The SecureAgent then forwards the encrypted state and associated signatures to the SecureStateManager by calling decrypt_state (encrypted_state, signatures). This step initiates the process of securely decrypting the agent's state.

The SecureStateManager coordinates with the ShamirSecretSharing component to reconstruct the secret key required for decryption. This is done by calling reconstruct_secret (shares, threshold), where 'shares' may represent the distributed key shares, and 'threshold' may indicate the minimum number of shares required for reconstruction.

Once the secret key is reconstructed, the ShamirSecretSharing component returns the reconstructed_key to the SecureStateManager. This reconstructed key is then used by the Fernet component to perform the actual decryption of the state.

The SecureStateManager calls decrypt (state_bytes) on the Fernet component, passing the encrypted state data. Fernet, which may implement symmetric encryption algorithms, decrypts the state and returns the decrypted_state to the SecureStateManager.

Upon receiving the decrypted state, the SecureStateManager may perform additional processing, such as deserializing the state data, by calling_descrialize_state (state). This step may convert the raw decrypted data into a format that can be used by the agent.

With the decrypted and deserialized state available, the SecureAgent proceeds to the Agent Execution phase. During this phase, the agent performs its designated tasks and potentially modifies its internal state.

After the execution completes, the SecureAgent receives the new_state from the agent. This updated state may reflect the changes made during the agent's execution and needs to be securely stored for future use.

Following the agent execution, the SecureAgent enters the Encryption Phase to secure the updated state. The SecureAgent initiates this process by calling encrypt_state (new_state, addresses) on the SecureStateManager.

The SecureStateManager begins by serializing the new state data through the _serialize_state (state) method. This serialization process may convert the state into a format suitable for encryption and storage.

Next, the SecureStateManager coordinates with the ShamirSecretSharing component to split the encryption key into shares. This is done by calling split_secret (key, threshold, total_shares), where 'key' may be the encryption key, 'threshold' may represent the minimum number of shares required for reconstruction, and 'total_shares' may indicate the total number of key shares to generate.

The ShamirSecretSharing component returns the generated key_shares to the SecureStateManager. These shares may be distributed among authorized parties, enhancing the security of the encryption key.

With the key shares prepared, the SecureStateManager proceeds to encrypt the serialized state. It calls encrypt (state_bytes) on the Fernet component, which performs the encryption using the previously established encryption key.

The Fernet component returns the encrypted_state to the SecureStateManager, which then passes both the encrypted_state and key_shares back to the SecureAgent.

As a final step in the encryption process, the SecureAgent generates a signature for the encrypted state by calling sign_state (encrypted_state). This signature may serve as a means of verifying the authenticity and integrity of the encrypted state in future operations.

The secure execution flow concludes with the SecureAgent returning a package containing the encrypted_state, signatures, and key_shares back to the original Agent. This package encapsulates the updated and secured state of the agent, ready for storage or transmission.

Hardware and Software Implementations

The secure multi-agent system for privacy-preserving distributed computation may be implemented using a variety of hardware and software solutions, each contributing to the overall security, efficiency, and scalability of the system. This section provides a comprehensive overview of the potential implementations, considering both the computational requirements and the security constraints inherent in the system's design.

The hardware execution environment for the secure multi-agent system may comprise a heterogeneous computing infrastructure to accommodate the diverse computational needs of different system components.

In some cases, the system may utilize high-performance computing (HPC) clusters to handle the intensive computational tasks associated with large-scale machine learning models and cryptographic operations. These clusters may consist of multiple nodes, each equipped with multi-core CPUs and high-bandwidth memory. For example, a cluster may incorporate Intel Xeon Scalable processors or AMD EPYC processors, which offer high core counts and support for advanced vector extensions (AVX) that can accelerate certain cryptographic operations.

Graphics Processing Units (GPUs) may play a role in accelerating the training and inference processes of the AI models within the system. NVIDIA Tesla V100 or A100 GPUS, or AMD Instinct MI100 accelerators, may be employed for their high floating-point performance and support for mixed-precision operations. These GPUs may be particularly beneficial for implementing the privacy layer 900, where operations such as dimensionality reduction and noise addition can be parallelized effectively.

Field-Programmable Gate Arrays (FPGAs) may be integrated into the system to provide hardware acceleration for specific cryptographic operations, such as those performed by the secure state management module 502. FPGAs from manufacturers like Xilinx or Intel may be programmed to implement custom encryption and decryption circuits, potentially offering higher throughput and lower latency compared to software implementations.

For edge computing scenarios, where atomic agents may need to operate with limited resources, the system may incorporate specialized AI accelerators such as Google's Edge TPU or NVIDIA's Jetson modules. These devices may offer a balance between computational power and energy efficiency, enabling secure AI processing in resource-constrained environments.

The storage system 1000 may be implemented using a combination of high-performance and secure storage solutions to manage the encrypted model weights and associated metadata.

Solid-State Drives (SSDs) with NVMe interfaces may serve as the primary storage medium for the weight storage 1008, offering high read and write speeds to minimize latency during model loading and saving operations. Enterprise-grade SSDs from manufacturers like Samsung or Intel may be employed for their reliability and endurance in write-intensive environments.

For long-term storage and backup of encrypted models, the system may utilize object storage systems such as Amazon S3, Google Cloud Storage, or on-premises solutions like MinIO. These systems may offer scalability, redundancy, and built-in encryption features that complement the security measures implemented by the storage system 1000.

To enhance data locality and reduce latency, the system may incorporate distributed caching solutions such as Redis or Memcached. These in-memory data stores may cache frequently accessed model weights or intermediate computation results, improving the overall system performance.

The secure communication protocol 800 may be implemented over a high-speed, low-latency network infrastructure to facilitate efficient inter-agent communication and data transfer.

InfiniBand or RoCE (RDMA over Converged Ethernet) networks may be employed for their high bandwidth and low latency characteristics, which are used for distributed computing environments. These technologies may support remote direct memory access (RDMA), allowing for efficient data transfer between nodes without significant CPU overhead.

For wide-area network (WAN) communications, the system may utilize software-defined wide area network (SD-WAN) solutions to optimize routing and ensure secure, efficient data transfer between geographically distributed components. This may be particularly relevant for implementing the data localization features 808 and managing cross-region communications.

To support the local mesh network protocol 816, the system may incorporate technologies such as Bluetooth Mesh or Zigbee for creating resilient, self-healing networks in scenarios where traditional network infrastructure may be unavailable or compromised.

Dedicated cryptographic hardware may be employed to enhance the security and performance of cryptographic operations throughout the system.

Hardware Security Modules (HSMs) may be utilized for secure key generation, storage, and management. These tamper-resistant devices may safeguard the cryptographic keys used by the key generator 1002 and provide hardware-accelerated cryptographic operations. HSMs from manufacturers like Thales or Gemalto may offer FIPS 140-2 Level 3 or 4 certification, providing a high level of assurance for key management operations.

Trusted Platform Modules (TPMs) may be integrated into each physical server or node in the system to provide a root of trust and enable secure boot processes. TPMs may also assist in remote attestation, ensuring the integrity of the hardware and software stack running on each node.

For blockchain-related operations, the system may incorporate specialized blockchain hardware wallets or secure elements to store private keys associated with the address modules 1012, 1014, and 1016. Devices like Ledger Nano X or Trezor Model T may provide an additional layer of security for managing blockchain identities and signing transactions.

The software implementation of the secure multi-agent system may leverage a combination of open-source and proprietary technologies to create a robust, scalable, and secure environment.

The underlying operating system for the hardware execution environment may be a hardened, security-focused Linux distribution such as SELinux or grsecurity. These distributions may provide enhanced access controls and kernel-level security features that complement the system's security measures.

Containerization technologies like Docker or Podman may be employed to encapsulate individual components of the system, such as atomic agents or the orchestrator agent 700. Container orchestration platforms like Kubernetes may be used to manage the deployment, scaling, and lifecycle of these containerized components across the distributed infrastructure.

The system may utilize distributed computing frameworks to manage the execution of tasks across the network of atomic agents. Apache Spark or Dask may be employed for their ability to handle large-scale data processing and machine learning workloads in a distributed manner. These frameworks may be particularly useful for implementing the task distribution module 702 and result aggregation module 704 of the orchestrator agent 700.

For managing the workflow of complex AI tasks, the system may incorporate workflow management systems such as Apache Airflow or Luigi. These tools may assist in defining, scheduling, and monitoring the execution of interdependent tasks across the distributed environment.

The implementation of AI models within the system may leverage popular machine learning frameworks such as TensorFlow, PyTorch, or JAX. These frameworks may provide the necessary abstractions and optimizations for implementing the privacy layer 900 and other AI-related components.

To support federated learning scenarios, the system may incorporate frameworks like TensorFlow Federated or PySyft, which provide primitives for privacy-preserving machine learning across distributed datasets.

The cryptographic operations within the system may be implemented using well-established cryptographic libraries to ensure the security and correctness of these components.

OpenSSL or libsodium may serve as the foundation for implementing symmetric and asymmetric encryption algorithms, as well as cryptographic hash functions. These libraries may be used extensively in the secure state management module 502 and the encrypted state transition management module 504.

For implementing the threshold cryptography features, the system may utilize specialized libraries such as TPKE (Threshold Proxy Re-Encryption) or Shamir's Secret Sharing implementations from the PyCryptodome library.

The digital signature verification module 508 may leverage blockchain-specific cryptographic libraries like web3.py for Ethereum-based signatures or bitcoin-core for Bitcoin-style signatures, depending on the chosen blockchain network 1010.

The integration with blockchain technologies may be facilitated through the use of blockchain client software and development frameworks.

For Ethereum-based implementations, the system may utilize Geth (Go Ethereum) or Parity as full node implementations, allowing for direct interaction with the blockchain network 1010. Smart contract development and deployment may be managed using frameworks like Truffle or Hardhat.

Hyperledger Fabric may be employed as an alternative blockchain platform, offering enhanced privacy features and permissioned network capabilities that align with the system's security requirements.

The system may incorporate both relational and NoSQL database systems to manage various types of data within the secure multi-agent environment.

PostgreSQL or MySQL may serve as the primary relational database management system, handling structured data related to agent states, task assignments, and system configurations. These databases may be configured with encryption-at-rest and encryption-in-transit to ensure data security.

For handling large volumes of unstructured or semi-structured data, such as intermediate computation results or model metadata, the system may employ NoSQL databases like MongoDB or Apache Cassandra. These databases may offer horizontal scalability and flexible data models that accommodate the diverse data types processed by the system.

Time-series databases such as InfluxDB or TimescaleDB may be utilized for storing and analyzing temporal data, such as performance metrics or privacy budget consumption over time.

The system's security infrastructure may be augmented with intrusion detection systems (IDS) and security information and event management (SIEM) solutions. Open-source tools like Snort or Suricata may be deployed for network-based intrusion detection, while OSSEC may provide host-based intrusion detection capabilities.

Log management and analysis may be handled by the ELK stack (Elasticsearch, Logstash, and Kibana) or Splunk, enabling centralized logging, real-time monitoring, and advanced analytics of system events and security incidents.

The development and maintenance of the secure multi-agent system may be supported by a comprehensive set of development and deployment tools.

Version control systems like Git, hosted on platforms such as GitHub or GitLab, may facilitate collaborative development and version management of the system's codebase.

Continuous Integration and Continuous Deployment (CI/CD) pipelines may be implemented using tools like Jenkins, GitLab CI, or GitHub Actions. These pipelines may automate the build, test, and deployment processes, ensuring consistent and secure software releases.

Infrastructure-as-Code (IaC) tools such as Terraform or Ansible may be employed to manage and version the system's infrastructure configuration, enabling reproducible deployments across different environments.

Throughout this disclosure, various terms and phrases are used to describe features of the disclosed technology. It is to be understood that these terms and phrases may encompass a variety of meanings and definitions, as is common in the field of technology and patent law. The definitions of these terms may vary depending on the context in which they are used, the specific embodiment being described, or the interpretation of the technology by those skilled in the art.

In various embodiments, certain variable names, symbols, or labels may be used in the claims to represent various elements, components, or steps of the described methods, systems, and apparatuses. These variable names, symbols, or labels are provided for convenience and clarity in describing the claimed subject matter. However, it should be understood that the use of such variable names, symbols, or labels in the claims does not necessarily limit these elements, components, or steps to being the same specific entities described in the specification or in other parts of the disclosure. The variable names, symbols, or labels used in the claims should be interpreted broadly and may encompass various implementations, variations, or equivalents of the described elements, components, or steps, unless explicitly stated otherwise or clearly limited by the context of the claim. As such, the scope of the claims is not confined to the specific examples or embodiments described in the specification, but rather extends to the full breadth of the inventive concepts disclosed herein.

For instance, terms such as "computing device," "processor," "memory," and "network" may refer to a wide range of devices, components, systems, and configurations known in the art, and their specific definitions may differ based on the implementation or design of the system. Similarly, phrases like "securely storing," "computing a vector," and "generating a message" may involve various methods, techniques, and processes that achieve the same or similar outcomes but may be executed in different manners.

It is also to be understood that the use of terms in the singular or plural form is not intended to limit the scope of the claims. For example, the mention of "a computing device" does not preclude the presence of multiple computing devices within a system. Likewise, references to "a network" may include various interconnected networks or a single network comprising multiple segments or layers.

Furthermore, the use of the term "may" in relation to an action or feature indicates that the action or feature is possible, but not necessarily mandatory. This term is used to describe optional or alternative aspects of the disclosed technology that provide flexibility in how the technology may be implemented or utilized.

The definitions provided herein are intended to serve as examples and are not exhaustive. Those skilled in the art may ascribe different meanings to these terms based on the context, the specific technology being described, or the advancements in the field. Therefore, the definitions of the terms and phrases used in this disclosure and the claims are to be interpreted broadly and in a manner consistent with the understanding of those skilled in the relevant art.

The use of the word "a" or "an" when used in conjunction with the claims herein is to be interpreted as including one or more than one of the element it introduces. Similarly, the use of the term "or" is intended to be inclusive, such that the phrase "A or B" is intended to include A, B, or both A and B, unless explicitly stated otherwise.

Reference throughout the specification to "one embodiment," "another embodiment," "an embodiment," and so forth, means that a particular feature, structure, or characteristic described in connection with the embodiment is included in at least one embodiment of the present disclosure, and may not necessarily be present in all embodiments. Furthermore, the particular features, structures, or characteristics may be combined in any suitable manner in one or more embodiments without limitation.

The use of the terms "first," "second," and the like does not imply any order or sequence, but are used to distinguish one element from another, and the terms "top," "bottom," "front," "back," "leading," "trailing," and the like are used for descriptive purposes and are not necessarily to be construed as limiting.

As used herein, the term "processor" refers to any computing entity capable of executing instructions to perform a specific set of operations, whether implemented in hardware, firmware, software, or any combination thereof. This definition includes, but is not limited to, the following types of processors: Central Processing Unit CPU, Graphics Processing Unit GPU, Digital Signal Processor DSP, Field-Programmable Gate Array FPGA, Application-Specific Integrated Circuit ASIC, microcontroller, System on Chip SoC, Neural Processing Unit NPU, quantum processor, cloud-based and distributed processors, multi-core and parallel processors, and virtual processors. The term "processor" also encompasses the associated memory hierarchies, including primary memory such as RAM, secondary storage such as hard drives and SSDs, and cache memory, which work in conjunction with the processor to store and retrieve data necessary for executing instructions. In this patent application, any reference to a "processor" should be interpreted broadly to include any type of processing unit capable of performing the described functions, regardless of its specific implementation, architecture, or physical form.

As used herein, the term "messages" may refer to any form of data or information that can be processed, transmitted, or stored in a digital format. Messages may include, but are not limited to, arbitrary-length plaintext messages, pre-hashed messages, concatenated messages, binary data, network protocol messages, database records, and time-stamped messages. Messages may be composed of characters, symbols, or binary data and may represent various forms of content such as text, numbers, multimedia, executable code, or any other data that can be digitally encoded. Messages may be used as input for cryptographic functions, such as keyed hash functions, where they are transformed into a fixed-size hash value influenced by a secret cryptographic key. The term "messages" encompasses a wide range of data types and structures, from simple text strings to complex structured data, and may include meta-data, headers, footers, or other information that facilitates the processing, transmission, or interpretation of the content. Messages may be generated by users, systems, or processes and may be intended for various purposes, including communication, authentication, verification, logging, or any other function that involves the use of digital data.

The term "database" should be construed to mean a blockchain, distributed ledger technology, key-value store, document-oriented database, graph database, time-series database, in-memory database, columnar database, object-oriented database, hierarchical database, network database, or any other structured data storage system capable of storing and retrieving information. This may include traditional relational database management systems RDBMS, NoSQL databases, NewSQL databases, or hybrid database systems that combine multiple database paradigms. The database may be centralized, distributed, or decentralized, and may employ various data models, indexing strategies, and query languages to organize and access the stored information. It may also incorporate features such as ACID Atomicity, Consistency, Isolation, Durability compliance, eventual consistency, sharding, replication, or partitioning to ensure data integrity, availability, and scalability. The database may be hosted on-premises, in the cloud, or in a hybrid environment, and may support various access methods including direct queries, API calls, or event-driven architectures.

The terms "connected," "coupled," or any variant thereof, mean any direct or indirect connection or coupling between two or more elements, and may encompass the presence of one or more intermediate elements between the two elements that are connected or coupled to each other.

The description of the embodiments of the present disclosure is intended to be illustrative, and not to limit the scope of the claims. Many alternatives, modifications, and variations will be apparent to those skilled in the art. A number of implementations have been described. Nevertheless, it will be understood that various modifications may be made without departing from the spirit and scope of the disclosure. Accordingly, other implementations are within the scope of the following claims.

The invention claimed is:

1. A system for secure compute using artificial intelligence agents, comprising: a hardware execution environment comprising one or more computerized processors and electronic storage media, the one or more processors configured to establish:
   a. a secure agent, wherein the secure agent comprises:
      i. a secure state management module configured to encrypt and decrypt states of a plurality of agents stored on the electronic storage media using a multisignature scheme, wherein the multisignature scheme requires a threshold number of signatures from a plurality of authorized blockchain addresses to access the encrypted states,
      ii. an encrypted state transition management module that interfaces with the secure state management module, the encrypted state transition management module configured to encrypt a first state of a first agent before transmission of the first state to a second agent using a symmetric encryption algorithm and decrypt a second encrypted state received encrypted state from the second agent using a corresponding symmetric decryption algorithm and a shared key,
      iii. a threshold cryptography implementation for distributed key management, which interfaces with the secure state management module to split encryption keys into a plurality of key shares, and
      iv. a digital signature verification module in communication with the threshold cryptography implementation to verify authenticity of a plurality of signatures provided by the plurality of authorized blockchain addresses during a key reconstruction process,
b. a plurality of atomic agents each configured to perform a designated computational task related to a composite task, wherein each atomic agent of the plurality of atomic agents comprises:
   i. a task-specific execution module configured to perform the designated computational task related to the composite task,
   ii. a state management interface for securely interacting with the secure state management module using the multisignature scheme and the threshold cryptography implementation, and
   iii. communication module for exchanging a plurality of encrypted messages with other atomic agents of the plurality of atomic agents using a blockchain-based authentication and a symmetric encryption;
c. an orchestrator agent configured to coordinate secure execution of the plurality of atomic agents, wherein the orchestrator agent comprises:
   i. a task distribution module for assigning a plurality of encrypted tasks to the plurality of atomic agents using the blockchain-based authentication,
   ii. a result aggregation module for combining a plurality of encrypted outputs from the plurality of atomic agents using the threshold cryptography implementation and storing a plurality of aggregated results on the electronic storage media,
   iii. a workflow management module for defining and executing a plurality of secure task sequences using the encrypted state transition management module and dynamically reconfiguring an execution workflow to route a plurality of data and a plurality of computations through a plurality of sovereign-compliant atomic agents and a plurality of environments, and
   iv. a security policy enforcement module for ensuring compliance with a plurality of system-wide security protocols, including a digital signature verification using the plurality of authorized blockchain addresses;
d, wherein the orchestrator agent integrates the plurality of encrypted outputs from the plurality of atomic agents to perform the composite task while maintaining data integrity and security through the secure state management module.

2. The system of claim 1, wherein the encrypted state transition management module is configured to:
   a. verify integrity of a decrypted state using a cryptographic hash function;
   b. compare a generated hash value with a previously stored hash value to detect a plurality of modifications to the decrypted state during transmission; and
   c. initiate a secure key exchange protocol to establish a new shared symmetric key if an integrity verification fails or after a predetermined number of state transitions.

3. The system of claim 1, wherein the communication module implements a secure communication protocol for inter-agent messaging that employs an end-to-end encryption and further comprises:
   a. a key exchange mechanism for establishing a plurality of shared secret keys between the plurality of atomic agents, with support for a plurality of region-specific encryption algorithms;
   b. a message authentication code;
   c. a nonce generated using a cryptographically secure random number generator or a millisecond-precision timestamp;
   d. a plurality of data localization features configured to route a plurality of messages through a plurality of regional servers, implemented using a distributed hash table for peer discovery and a content-addressed networking protocol for message routing; and
   e. a fallback mechanism for secure local-only communication when a cross-border data transfer is restricted, utilizing a local mesh network protocol.

4. The system of claim 1, wherein the orchestrator agent is configured to:
   a. receive the plurality of encrypted outputs from the plurality of atomic agents, wherein the plurality of encrypted outputs are transmitted using a secure communication protocol with an end-to-end encryption;
   b. decrypt the plurality of encrypted outputs using the secure state management module, wherein a decryption process comprises verifying integrity of the plurality of encrypted outputs and executing a plurality of region-appropriate cryptographic algorithms;
   c. integrate a plurality of decrypted outputs to perform the composite task, wherein an integration process includes:
      1. Analyzing and combining a plurality of data from the plurality of atomic agents,
      2. Applying a plurality of task-specific algorithms to process a plurality of combined data,
      3. Resolving a plurality of conflicts or a plurality of inconsistencies between the plurality of decrypted outputs from different atomic agents of the plurality of atomic agents; and
   d. encrypt an integrated result before transmission or storage.

5. The system of claim 1, wherein the secure state management module implements a key rotation protocol, comprising:
   a. generating a new encryption key using a cryptographically secure random number generator and splitting the new encryption key into a plurality of new key shares using a threshold secret sharing scheme at a plurality of predefined intervals, wherein the plurality of predefined intervals are dynamically adjusted based on a collective state of the plurality of atomic agents;
   b. distributing the plurality of new key shares to the plurality of authorized blockchain addresses associated with the plurality of atomic agents, utilizing a secure communication protocol of an agent framework;
   c. establishing a transition period where both an old encryption key and the new encryption key are valid;
   d. re-encrypting a plurality of weights of an input privacy layer using the new encryption key;
   e. securely destroying the old encryption key and a plurality of old key shares after the transition period, coordinated by the orchestrator agent; and
   f. updating a plurality of agent state representations to reflect the new encryption key.

6. The system of claim 1, wherein the secure state management module includes a privacy budget tracking component configured to:
   a. monitor a cumulative privacy loss across a plurality of operations;
   b. adjust a noise addition in an input privacy layer based on a current privacy budget; and c. halt further operations when the current privacy budget is exhausted to prevent excessive information leakage.

7. The system of claim 1, wherein the plurality of atomic agents includes a data localization agent configured to:
   a. identify a plurality of data elements subject to a plurality of sovereign data regulations;
   b. segregate the plurality of identified data elements into a plurality of region-specific storage containers;
   c. apply a plurality of region-specific encryption schemes to a plurality of segregated data elements; and
   d. manage a plurality of access control policies to ensure the plurality of segregated data elements remain within a plurality of authorized geographical boundaries during processing.

8. The system of claim 1, wherein the orchestrator agent implements a first dynamic compliance module configured to:
   a. maintain a repository of a plurality of data sovereignty regulations for a plurality of jurisdictions;
   b. analyze a plurality of input data and a plurality of processing requirements against the repository of the plurality of data sovereignty regulations;
   c. dynamically adjust the execution workflow to route the plurality of data and the plurality of computations through a plurality of appropriate sovereign-compliant environments;
   d. generate a plurality of audit logs of a plurality of data flows and a plurality of processing locations; and
   e. trigger a plurality of alerts when a plurality of potential compliance violations are detected.

9. The system of claim 1, wherein the orchestrator agent implements a second dynamic compliance module configured to:
   a. maintain a distributed knowledge base of a plurality of data sovereignty regulations across an agent network, with a plurality of specialized atomic agents of the plurality of atomic agents responsible for updating and validating a plurality of regulatory information for a plurality of specific jurisdictions;
   b. analyze a plurality of input data and a plurality of processing requirements using a compliance analysis agent that interfaces with the distributed knowledge base;
   c. coordinate with a plurality of logging agents to generate a plurality of audit trails of a plurality of data movements and a plurality of processing activities across a distributed agent ecosystem; and
   d. employ a network of a plurality of monitoring agents that continuously assess a compliance status, triggering a plurality of alert protocols and initiating a plurality of corrective actions through the orchestrator agent when a plurality of potential compliance violations are detected.

10. The system of claim 1, wherein the orchestrator agent integrates the plurality of encrypted outputs from the plurality of atomic agents to perform the composite task by:
    a. receiving the plurality of encrypted outputs from the plurality of atomic agents using an asymmetric encryption;
    b. decrypting the plurality of encrypted outputs using a private key of the orchestrator agent;
    c. verifying authenticity of each output of the plurality of encrypted outputs using a plurality of digital signatures associated with a plurality of respective atomic agents of the plurality of atomic agents;
    d. aggregating a plurality of decrypted and verified outputs;
    e. re-encrypting a composite result using a threshold encryption scheme;
    f. updating a global encrypted state in the secure state management module; and
    g. distributing a plurality of encrypted task results to a plurality of authorized agents using a plurality of secure multiparty computation protocols.

11. A method for secure compute using artificial intelligence agents, comprising:
    a. establishing a secure agent in a hardware execution environment, the secure agent comprising:
        i. a secure state management module configured to encrypt and decrypt states of a plurality of agents stored on electronic storage media using a multisignature scheme, wherein the multisignature scheme requires a threshold number of signatures from a plurality of authorized blockchain addresses to access the encrypted states,
        ii. an encrypted state transition management module that interfaces with the secure state management module, the encrypted state transition management module configured to encrypt a first state of a first agent before transmission of the first state to a second agent using a symmetric encryption algorithm and decrypt a second encrypted state received from the second agent using a corresponding symmetric decryption algorithm and a shared key,
        iii. a threshold cryptography implementation for distributed key management, which interfaces with the secure state management module to split encryption keys into a plurality of key shares, and
        iv. a digital signature verification module in communication with the threshold cryptography implementation to verify authenticity of a plurality of signatures provided by the plurality of authorized blockchain addresses during a key reconstruction process;
    b. configuring a plurality of atomic agents to perform a composite task, wherein each atomic agent of the plurality of atomic agents comprises:
        i. a task-specific execution module configured to perform a designated computational task related to the composite task,
        ii. a state management interface for securely interacting with the secure state management module using the multisignature scheme and the threshold cryptography implementation, and
        iii. a communication module for exchanging a plurality of encrypted messages with other atomic agents of the plurality of atomic agents using a blockchain-based authentication and a symmetric encryption;
    c. establishing an orchestrator agent to coordinate secure execution of the plurality of atomic agents, wherein the orchestrator agent comprises:
        i. a task distribution module for assigning a plurality of encrypted tasks to the plurality of atomic agents using the blockchain-based authentication,
        ii. a result aggregation module for combining a plurality of encrypted outputs from the plurality of atomic agents using the threshold cryptography implementation and storing a plurality of aggregated results on the electronic storage media,
        iii. a workflow management module for defining and executing a plurality of secure task sequences using the encrypted state transition management module and dynamically reconfiguring an execution workflow to route a plurality of data and a plurality of computations through a plurality of sovereign-compliant atomic agents and a plurality of environments, and iv. a security policy enforcement module for ensuring compliance with a plurality of system-wide security protocols, including a digital signature verification using the plurality of authorized blockchain addresses;

v. wherein the orchestrator agent integrates the plurality of encrypted outputs from the plurality of atomic agents to perform the composite task while maintaining data integrity and security through the secure state management module.

12. The method of claim 11, wherein the encrypted state transition management module is configured to:

a. verify the integrity of a decrypted state using a cryptographic hash function;

b. compare a generated hash value with a previously stored hash value to detect a plurality of modifications to the decrypted state during transmission; and c. initiate a secure key exchange protocol to establish a new shared symmetric key if an integrity verification fails or after a predetermined number of state transitions.

13. The method of claim 11, further comprising implementing a secure communication protocol for inter-agent messaging that employs an end-to-end encryption and comprises:

a. a key exchange mechanism for establishing a plurality of shared secret keys between the plurality of atomic agents, with support for a plurality of region-specific encryption algorithms;

b. a message authentication code;

c. a nonce generated using a cryptographically secure random number generator or a millisecond-precision timestamp;

d. a plurality of data localization features configured to route a plurality of messages through a plurality of regional servers, implemented using a distributed hash table for peer discovery and a content-addressed networking protocol for message routing; and e. a fallback mechanism for secure local-only communication when a cross-border data transfer is restricted, utilizing a local mesh network protocol.

14. The method of claim 11, wherein the orchestrator agent is configured to:

a. receive the plurality of encrypted outputs from the plurality of atomic agents, wherein the plurality of encrypted outputs are transmitted using a secure communication protocol with an end-to-end encryption;

b. decrypt the plurality of encrypted outputs using the secure state management module, wherein a decryption process comprises verifying the integrity of the plurality of encrypted outputs and executing a plurality of region-appropriate cryptographic algorithms;

c. integrate a plurality of decrypted outputs to perform the composite task, wherein an integration process includes:

i. analyzing and combining a plurality of data from the plurality of atomic agents, ii. applying a plurality of task-specific algorithms to process a plurality of combined data, iii. resolving a plurality of conflicts or a plurality of inconsistencies between the plurality of decrypted outputs from different atomic agents of the plurality of atomic agents; and iv. encrypt an integrated result before transmission or storage.

15. The method of claim 11, further comprising implementing a key rotation protocol in the secure state management module, comprising:

a. generating a new encryption key using a cryptographically secure random number generator and splitting the new encryption key into a plurality of new key shares using a threshold secret sharing scheme at a plurality of predefined intervals, wherein the plurality of predefined intervals are dynamically adjusted based on a collective state of the plurality of atomic agents;

b. distributing the plurality of new key shares to the plurality of authorized blockchain addresses associated with the plurality of atomic agents, utilizing a secure communication protocol of an agent framework;

c. establishing a transition period where both an old encryption key and the new encryption key are valid;

d. re-encrypting a plurality of weights of an input privacy layer using the new encryption key;

e. securely destroying the old encryption key and a plurality of old key shares after the transition period, coordinated by the orchestrator agent; and f. updating a plurality of agent state representations to reflect the new encryption key.

16. The method of claim 11, further comprising implementing a privacy budget tracking component in the secure state management module configured to:

a. monitor a cumulative privacy loss across a plurality of operations;

b. adjust a noise addition in an input privacy layer based on a current privacy budget; and c. halt further operations when the current privacy budget is exhausted to prevent excessive information leakage.

17. The method of claim 11, further comprising implementing a data localization agent configured to:

a. identify a plurality of data elements subject to a plurality of sovereign data regulations;

b. segregate the plurality of identified data elements into a plurality of region-specific storage containers;

c. apply a plurality of region-specific encryption schemes to the plurality of segregated data elements; and d. manage a plurality of access control policies to ensure the plurality of segregated data elements remain within a plurality of authorized geographical boundaries during processing.

18. The method of claim 11, further comprising implementing a dynamic compliance module in the orchestrator agent configured to:

a. maintain a distributed knowledge base of a plurality of data sovereignty regulations across an agent network, with a plurality of specialized atomic agents of the plurality of atomic agents responsible for updating and validating a plurality of regulatory information for a plurality of specific jurisdictions;

b. analyze a plurality of input data and a plurality of processing requirements using a compliance analysis agent that interfaces with the distributed knowledge base;

c. coordinate with a plurality of logging agents to generate a plurality of audit trails of a plurality of data movements and a plurality of processing activities across a distributed agent ecosystem; and d. employ a network of a plurality of monitoring agents that continuously assess a compliance status, triggering a plurality of alert protocols and initiating a plurality of corrective actions through the orchestrator agent when a plurality of potential compliance violations are detected.

19. A non-transitory computer-readable medium storing instructions that, when executed by one or more processors, cause the one or more processors to perform operations comprising:
   a. establishing a secure agent in a hardware execution environment, the secure agent comprising:
      i. a secure state management module configured to encrypt and decrypt states of a plurality of agents stored on electronic storage media using a multisignature scheme, wherein the multisignature scheme requires a threshold number of signatures from a plurality of authorized blockchain addresses to access the encrypted states,
      ii. an encrypted state transition management module that interfaces with the secure state management module, the encrypted state transition management module configured to encrypt a first state of a first agent before transmission of the first state to a second agent using a symmetric encryption algorithm and decrypt a second encrypted state received from the second agent using a corresponding symmetric decryption algorithm and a shared key,
      iii. a threshold cryptography implementation for distributed key management, which interfaces with the secure state management module to split encryption keys into a plurality of key shares, and
      iv. a digital signature verification module in communication with the threshold cryptography implementation to verify authenticity of a plurality of signatures provided by the plurality of authorized blockchain addresses during a key reconstruction process;
   b. configuring a plurality of atomic agents to perform a composite task, wherein each atomic agent of the plurality of atomic agents comprises:
      i. a task-specific execution module configured to perform a designated computational task related to the composite task,
      ii. a state management interface for securely interacting with the secure state management module using the multisignature scheme and the threshold cryptography implementation, and
      iii. a communication module for exchanging a plurality of encrypted messages with other atomic agents of the plurality of atomic agents using a blockchain-based authentication and a symmetric encryption;
   c. establishing an orchestrator agent to coordinate secure execution of the plurality of atomic agents, wherein the orchestrator agent comprises:
      i. a task distribution module for assigning a plurality of encrypted tasks to the plurality of atomic agents using the blockchain-based authentication,
      ii. a result aggregation module for combining a plurality of encrypted outputs from the plurality of atomic agents using the threshold cryptography implementation and storing a plurality of aggregated results on the electronic storage media,
      iii. a workflow management module for defining and executing a plurality of secure task sequences using the encrypted state transition management module and dynamically reconfiguring an execution workflow to route a plurality of data and a plurality of computations through a plurality of sovereign-compliant atomic agents and a plurality of environments, and
      iv. a security policy enforcement module for ensuring compliance with a plurality of system-wide security protocols, including a digital signature verification using the plurality of authorized blockchain addresses;
      v. wherein the orchestrator agent integrates the plurality of encrypted outputs from the plurality of atomic agents to perform the composite task while maintaining data integrity and security through the secure state management module.

20. The non-transitory computer-readable medium of claim 19, wherein the operations further comprise:
   a. implementing a secure communication protocol for inter-agent messaging that employs an end-to-end encryption and comprises:
      i. a key exchange mechanism for establishing a plurality of shared secret keys between the plurality of atomic agents, with support for a plurality of region-specific encryption algorithms;
      ii. a message authentication code;
      iii. a nonce generated using a cryptographically secure random number generator or a millisecond-precision timestamp;
      iv. a plurality of data localization features configured to route a plurality of messages through a plurality of regional servers, implemented using a distributed hash table for peer discovery and a content-addressed networking protocol for message routing; and
      v. a fallback mechanism for secure local-only communication when a cross-border data transfer is restricted, utilizing a local mesh network protocol;
   b. implementing a key rotation protocol in the secure state management module, comprising:
      i. generating a new encryption key using a cryptographically secure random number generator and splitting the new encryption key into a plurality of new key shares using a threshold secret sharing scheme at a plurality of predefined intervals, wherein the plurality of predefined intervals are dynamically adjusted based on a collective state of the plurality of atomic agents;
      ii. distributing the plurality of new key shares to the plurality of authorized blockchain addresses associated with the plurality of atomic agents, utilizing a secure communication protocol of an agent framework;
      iii. establishing a transition period where both an old encryption key and the new encryption key are valid;
      iv. re-encrypting a plurality of weights of an input privacy layer using the new encryption key;
      v. securely destroying the old encryption key and a plurality of old key shares after the transition period, coordinated by the orchestrator agent; and
      vi. updating a plurality of agent state representations to reflect the new encryption key.

* * * * *